(12) United States Patent
Saito et al.

(10) Patent No.: US 9,564,964 B2
(45) Date of Patent: Feb. 7, 2017

(54) OPTICAL SIGNAL PROCESSING DEVICE, OPTICAL SIGNAL PROCESSING METHOD AND RECORDING MEDIUM

(71) Applicants: FUJITSU LIMITED, Kawasaki-shi, Kanagawa (JP); FUJITSU TELECOM NETWORKS LIMITED, Kawasaki-shi, Kanagawa (JP)

(72) Inventors: Taku Saito, Kawasaki (JP); Katsumi Fukumitsu, Kawasaki (JP); Osamu Takeuchi, Kawasaki (JP); Hirofumi Araki, Kawasaki (JP); Kanji Naito, Kawasaki (JP); Shoichi Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 14/294,722

(22) Filed: Jun. 3, 2014

(65) Prior Publication Data
US 2014/0363154 A1 Dec. 11, 2014

(30) Foreign Application Priority Data
Jun. 5, 2013 (JP) .................................. 2013-119280

(51) Int. Cl.
*H04B 10/60* (2013.01)
*H04B 10/079* (2013.01)
(Continued)

(52) U.S. Cl.
CPC ...... *H04B 10/0795* (2013.01); *H04B 10/6165* (2013.01); *H04L 27/223* (2013.01); *H04L 27/2053* (2013.01)

(58) Field of Classification Search
CPC .. H04B 10/07–10/0799; H04B 10/60–10/6973
(Continued)

(56) References Cited

U.S. PATENT DOCUMENTS 7,747,177 B2 * 6/2010 Chen .................. H04B 10/6165
398/204
8,655,193 B2 * 2/2014 Kikuchi ............. H04B 10/5055
398/159
(Continued)

FOREIGN PATENT DOCUMENTS

JP 2008-211801 9/2008
JP 2010-28795 2/2010
(Continued)

OTHER PUBLICATIONS

Extended European Search Report dated Oct. 30, 2014 in corresponding European Patent Application No. 14169974.4.
(Continued)

*Primary Examiner* — Li Liu
(74) *Attorney, Agent, or Firm* — Staas & Halsey LLP

(57) ABSTRACT

An optimization unit in an optical receiver divides a symbol region out of a plurality of symbol regions into which signal points that specifies symbol information included in an optical signal are classified, into a plurality of division regions from the symbol center coordinate of the symbol region. Moreover, the optimization unit accumulates the signal points of the symbol information for every division region in the symbol region. Furthermore, based on the accumulated number of signal points for every division region, the optimization unit controls the average length of a phase estimation unit when the phase noise of the optical signal is calculated.

5 Claims, 16 Drawing Sheets

(51) Int. Cl.
*H04B 10/61* (2013.01)
*H04L 27/22* (2006.01)
*H04L 27/20* (2006.01)

(58) Field of Classification Search
USPC .................................. 398/25–29, 202–214
See application file for complete search history.

(56) References Cited

U.S. PATENT DOCUMENTS

| | | | |
|---|---|---|---|
| 2007/0036555 A1* | 2/2007 | Chen | H04B 10/6165 398/188 |
| 2008/0205905 A1 | 8/2008 | Tao et al. | 398/204 |
| 2009/0317075 A1* | 12/2009 | Mandai | H04B 10/677 398/25 |
| 2011/0305457 A1* | 12/2011 | Kikuchi | H04B 10/5055 398/65 |
| 2012/0051754 A1* | 3/2012 | Sakamoto | H04B 10/032 398/115 |
| 2012/0087679 A1* | 4/2012 | Goldfarb | H04B 10/6165 398/208 |
| 2012/0269507 A1* | 10/2012 | Renaudier | H04B 10/0795 398/34 |
| 2013/0089342 A1 | 4/2013 | Oveis Gharan et al. | |
| 2013/0336649 A1* | 12/2013 | Essiambre | H04L 27/06 398/27 |

FOREIGN PATENT DOCUMENTS

| | | |
|---|---|---|
| JP | 2011-166597 | 8/2011 |
| JP | 2012-49964 | 3/2012 |

OTHER PUBLICATIONS

Arbab et al., "Effects of fiber impairments on constellation diagrams of optical phase modulated signals", Optical Engineering, vol. 51(4), Apr. 2012, 7 pp.

* cited by examiner

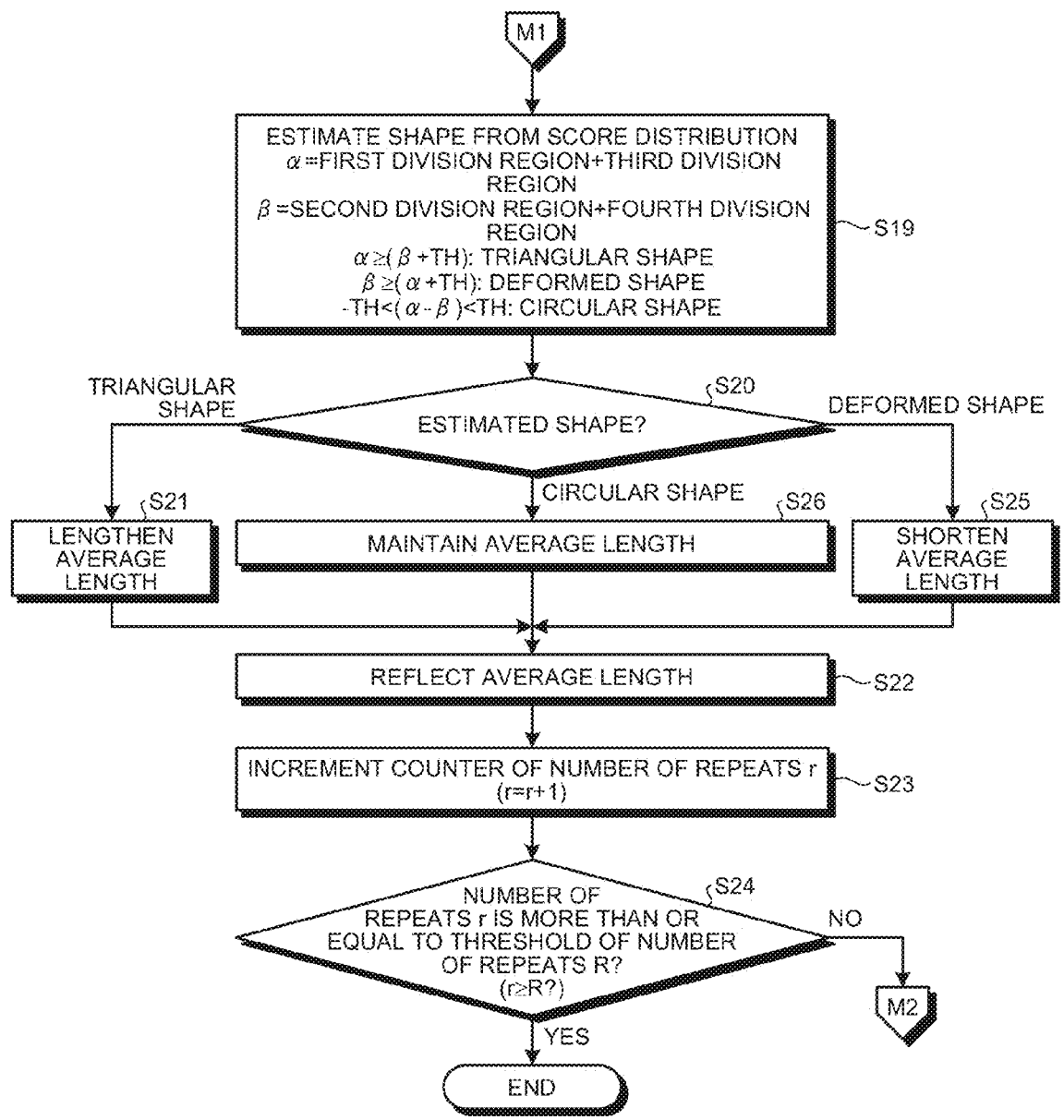

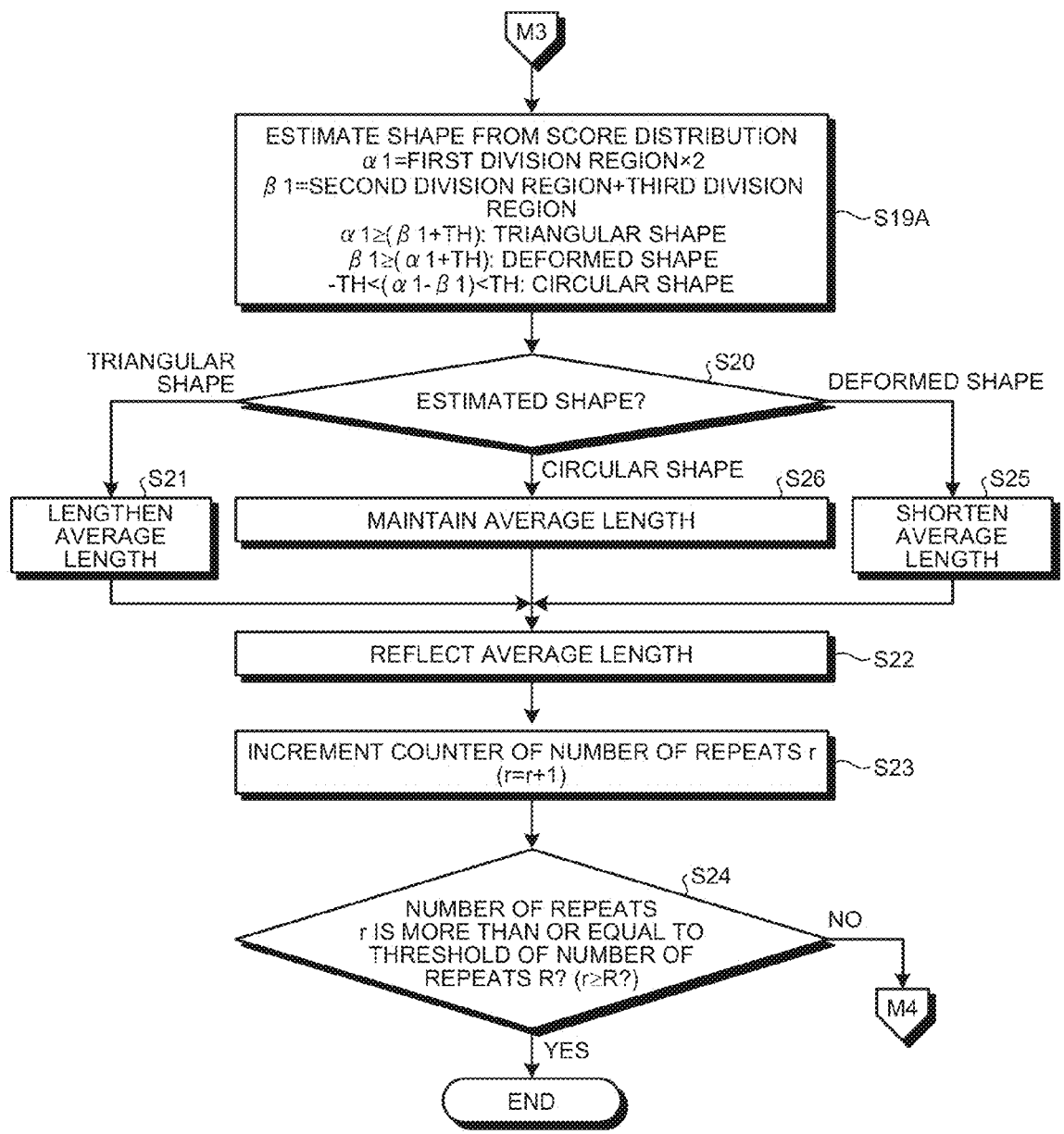

FIG.15
| EXAMPLES OF CONSTELLATION | AVERAGE LENGTH | CONSTELLA-TION SHAPE | BER |
|---|---|---|---|
| CONSTELLATION A 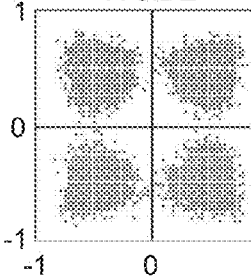 | SHORT | TRIANGULAR SHAPE | HIGH |
| CONSTELLATION B 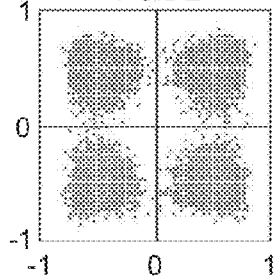 | OPTIMUM LENGTH | CIRCULAR SHAPE | LOW |
| CONSTELLATION C 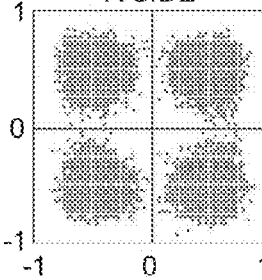 | LONG | CLOSE TO NEXT (DONUT-LIKE SHAPE) | HIGH |

FIG.16
(A)
EVM=SMALL
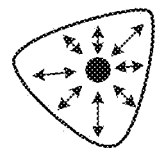
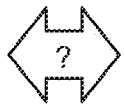
(B)
EVM=SMALL
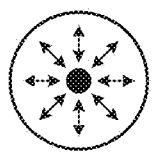
(C)
EVM=LARGE
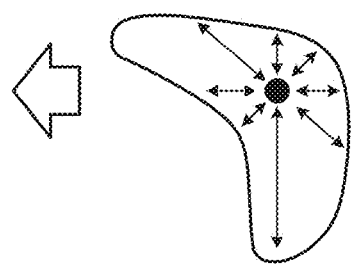

OPTICAL SIGNAL PROCESSING DEVICE, OPTICAL SIGNAL PROCESSING METHOD AND RECORDING MEDIUM

CROSS-REFERENCE TO RELATED APPLICATION

This application is based upon and claims the benefit of priority of the prior Japanese Patent Application No. 2013-119280, filed on Jun. 5, 2013, the entire contents of which are incorporated herein by reference.

FIELD

The embodiments discussed herein are directed to an optical signal processing device, an optical signal processing method and a recording medium.

BACKGROUND

In recent years, an optical transmission system of 40 Gbps or 100 Gbps has employed a digital coherent signal processing technique in which Dual Polarization-Quadrature Phase Shift Keying (DP-QPSK) modulation method is used. The digital coherent signal processing technique can, for example, improve the noise resistance and frequency usage efficiency and moreover achieve the long-distance transmission.

For example, when the phase of the carrier wave is estimated for extracting the symbol information out of received optical signals, a phase estimation circuit of an optical receiver having employed the digital coherent signal processing technique calculates the phase noise using a multiplication method. FIG. 12 is a block diagram illustrating an example of the phase estimation circuit. A phase estimation circuit 100 illustrated in FIG. 12 includes a phase estimation unit 101, a phase compensation unit 102, and a monitor unit 103. The phase estimation unit 101 estimates the phase θC of the carrier wave from a reception signal (θC+θS) including the phase θC of the carrier wave and the signal phase θS. Moreover, the phase estimation unit 101 calculates the phase noise by multiplying the reception signal. Then, the phase compensation unit 102 acquires the signal phase θS by removing the phase θC of the carrier wave including the phase noise from the reception signal (θC+θS) based on the estimated phase θC of the carrier wave and the calculated phase noise. The monitor unit 103 acquires the symbol information based on the signal phase θS acquired by the phase compensation unit 102.

Note that the multiplication method refers to a method of calculating the phase noise by multiplying by N, the reception signal modulated by the N-ary PSK method and moreover by dividing the N-multiplied signal into 1/N. FIG. 13 is an explanatory view illustrating an example of a process of a method of raising to the fourth power when the phase noise of the reception signal modulated by the QPSK method is calculated. In FIG. 13, in the case of the reception signal modulated by the QPSK method, in the constellation where the I component of the in-phase axis and the Q component of the quadrature axis are orthogonal, the signal points of quadrants are multiplied by four and the frequency of the four-multiplied signal is divided into ¼, whereby the phase noise is calculated.

Here, each reception signal modulated by the QPSK method is represented by $e^{\{j(\omega t+\theta)\}}$. θ refers to the phase corresponding to each symbol of the QPSK, and specifically, there are four kinds of phases of the symbol: π/4, −π/4, 3π/4, and −3π/4. Raising each reception signal to the fourth power leads to Formula (1).

$$(e^{j(\omega t+\theta)})^4 = e^{j(4\omega t+4\theta)} = e^{j(4\omega t)}e^{j(4\theta)} \qquad (1)$$

Then, a specific value is assigned to θ in $e^{j(4\theta)}$. In the case of θ=π/4, the symbol is $e^{j\pi}$=cos π+jsin π=−1. In the case of θ=−π/4, the symbol is $e^{-j\pi}$=cos(−π)+jsin(−π)=−1. In the case of θ=3π/4, the symbol is $e^{3j\pi}=e^{j\pi}$=−1. In the case of θ=−3π/4, the symbol is $e^{-3j\pi}=e^{-j\pi}$=−1.

In other words, all are summarized to −1 without depending on the symbol. Further, when the phase component θ that is different for every symbol is removed, just the noise component (ωt) remains. Then, the phase estimation unit 101 calculates the phase noise by integrating a predetermined number of noise components. Note that the estimation accuracy of the phase estimation circuit 100 largely depends on the number by which the biquadrate signal as the fourth power of the reception signal is multiplied. Therefore, in the method of raising to the fourth power, the phase estimation range within one quadrant is limited to ±45°, and when the phase has changed by 45° or more, the phase slip occurs out of the quadrant, in which case the deterioration in Bit Error Rate (BER) is caused.

In view of this, in order to reduce the frequency of the phase slip, more biquadrate signals are integrated to estimate the phase noise at higher accuracy. In other words, in the case of integrating more biquadrate signals, the average length of the phase estimation unit 101 needs to be longer. However, when the average length is too long, the biquadrate signals distribute more widely, so that the signal distributes from the quadrant to another adjacent quadrant; as a result, the estimation accuracy deteriorates. Therefore, the average length is not just set to be long simply but needs to be set to the appropriate length.

FIG. 14 is an explanatory view illustrating an example of the constellation of the QPSK method. In FIG. 14, the origin coordinates (I, Q) at which the Q component of the quadrature axis and the I component of the in-phase axis intersect are (0, 0). The symbol center coordinates X1 in a first quadrant A1 are (+0.5, +0.5), and the symbol center coordinates X2 in a second quadrant A2 are (−0.5, +0.5). The symbol center coordinates X3 in a third quadrant A3 are (−0.5, −0.5), and the symbol center coordinates X4 in a fourth quadrant A4 are (+0.5, −0.5).

The signal point of each symbol belongs to any one of the first quadrant A1, the second quadrant A2, the third quadrant A3, and the fourth quadrant A4, and the signal points distribute around the symbol center coordinates X1 to X4 of the quadrants A1 to A4. Therefore, each signal point is set in an ideal state as the point gets closer to the symbol center coordinates of each quadrant A1 to A4 because the BER is lower. In the actual optical transmission system, however, the transmission distance of the reception signal is long and the signal deterioration also occurs on the optical line, and the signal points distribute widely from the symbol center coordinates X1 to X4. The average length and the BER characteristic also change for every shape of the constellation, which is the set distribution of the signal points.

FIG. 15 is an explanatory view illustrating an example of the average length and the BER characteristic for every shape of the constellation. In the constellation "A" in FIG. 15, the shape of the constellation in each of the quadrants A1 to A4 is triangular, and the average length is short and the BER is high. In the constellation "B" in FIG. 15, the shape of the constellation in each of the quadrants A1 to A4 is circular, and the average length is optimum and the BER is low. In the constellation "C" in FIG. 15, the shape of the constellation in each of the quadrants A1 to A4 is a shape deformed to be close to a signal point of the adjacent quadrant, and the average length is long and the BER is high. Note that the shape of the constellation "C" is a donut-like shape when viewed across the entire quadrants A1 to A4 because the signal point in the quadrant is close to the signal point in another adjacent quadrant.

When the average length illustrated in FIG. 15 is focused, changing the average length can change the BER in addition to changing the shape of the constellation in each of the quadrates A1 to A4 to be the triangular shape, the circular shape, or the shape deformed to be close to the signal point of the adjacent quadrate.

In the optical receiver, the signal phase may change over time in accordance with the frequency deviation between the reception signal and the local oscillation signal, i.e., the frequency offset amount. In view of this, an offset compensation circuit that eliminates the frequency offset amount is disposed in the previous stage of the phase estimation circuit 100 in the optical receiver; however, a small amount of frequency offset remains, so that the phase noise is caused. Moreover, the optical transmission system has a plurality of sources of generating the phase noise on the optical line. As a result, under the influence of the phase noise, each signal point rotates around the origin coordinates (0, 0). The phase estimation circuit 100 removes the phase noise while checking the state of the signal point of each quadrant, and the update time interval is changed by changing the average length in the integration of the phase noise.

For example, when the time interval gets shorter, the average length becomes shorter and the amount of rotating around the origin coordinates also becomes smaller; as a result, the shape of the constellation becomes approximately triangular. On the contrary, when the time interval gets longer, the average length becomes longer and the amount of rotating around the origin coordinates becomes larger; as a result, the shape of the constellation becomes the shape deformed to be close to the signal point distribution of another adjacent quadrant. Therefore, it is necessary to optimize the average length for optimizing the time interval.

As a method of optimizing the average length, a method in which Error Vector Magnitude (EVM) is used is known. FIG. 16 are explanatory views illustrating an example of a method of selecting the average length of the QPSK method using EVM.

EVM refers to the method of calculating so that the distance from the symbol center coordinates of every quadrant to each signal point is minimized and selecting the optimal value. Since the constellation shape in FIG. 16A is triangular, the BER is high. Since the constellation shape in FIG. 16B is circular, the BER is low. Since the constellation shape in FIG. 16C is the shape deformed to be close to the signal point of the adjacent quadrant, the BER is high.

On this occasion, the EVM value of the constellation shape of FIG. 16C is higher than the EVM value of the constellation shape of FIG. 16A and FIG. 16B, and the BER of FIG. 16C is also higher than the BER of FIG. 16A and FIG. 16B. Therefore, when the EVM value is more than a predetermined value, the BER is also high; accordingly, the average length is shortened to set the optimal average length.

Japanese Laid-open Patent Publication No. 2011-166597
Japanese Laid-open Patent Publication No. 2008-211801
Japanese Laid-open Patent Publication No. 2012-049964
Japanese Laid-open Patent Publication No. 2010-028795

However, in the constellation shape of FIG. 16A and FIG. 16B, since there is no difference in EVM value, it is impossible to distinguish the constellation shape between the triangular shape and the circular shape. As a result, the phase estimation unit 101 determines that, for example, the shape is circular and the BER is low although the constellation shape is triangular and the BER is high, in which case it is difficult to calculate the correct phase noise.

SUMMARY

According to an aspect of an embodiment, an optical signal processing device includes an accumulation unit and a control unit. The accumulation unit divides at least one symbol region of a plurality of symbol regions into which signal points that specifies symbol information included in an optical signal are classified, into a plurality of division regions from center coordinates of the symbol region and accumulates the signal points of the symbol information for every division region in the symbol region. The control unit controls an average length in calculating a phase noise of the optical signal, based on the accumulated number of signal points for every division region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5B is a flowchart illustrating an example of a process operation of the optimization unit related to the average length setting process of the first embodiment;

FIG. 7B is a flowchart illustrating an example of a process operation of the optimization unit related to the average length setting process of the second embodiment;

FIG. 15 is an explanatory view illustrating an example of the average length and the characteristic of BER for every constellation shape; and FIG. 16 is an explanatory view illustrating an example of a method of selecting the average length of the QPSK method using EVM.

DESCRIPTION OF EMBODIMENTS

Preferred embodiments of the present invention will be explained with reference to accompanying drawings. Note that the technique disclosed herein is not limited by the embodiments below. Moreover, the embodiments below may be combined as appropriate to the extent that they do not contradict.

[a] First embodiment

Figure 1:
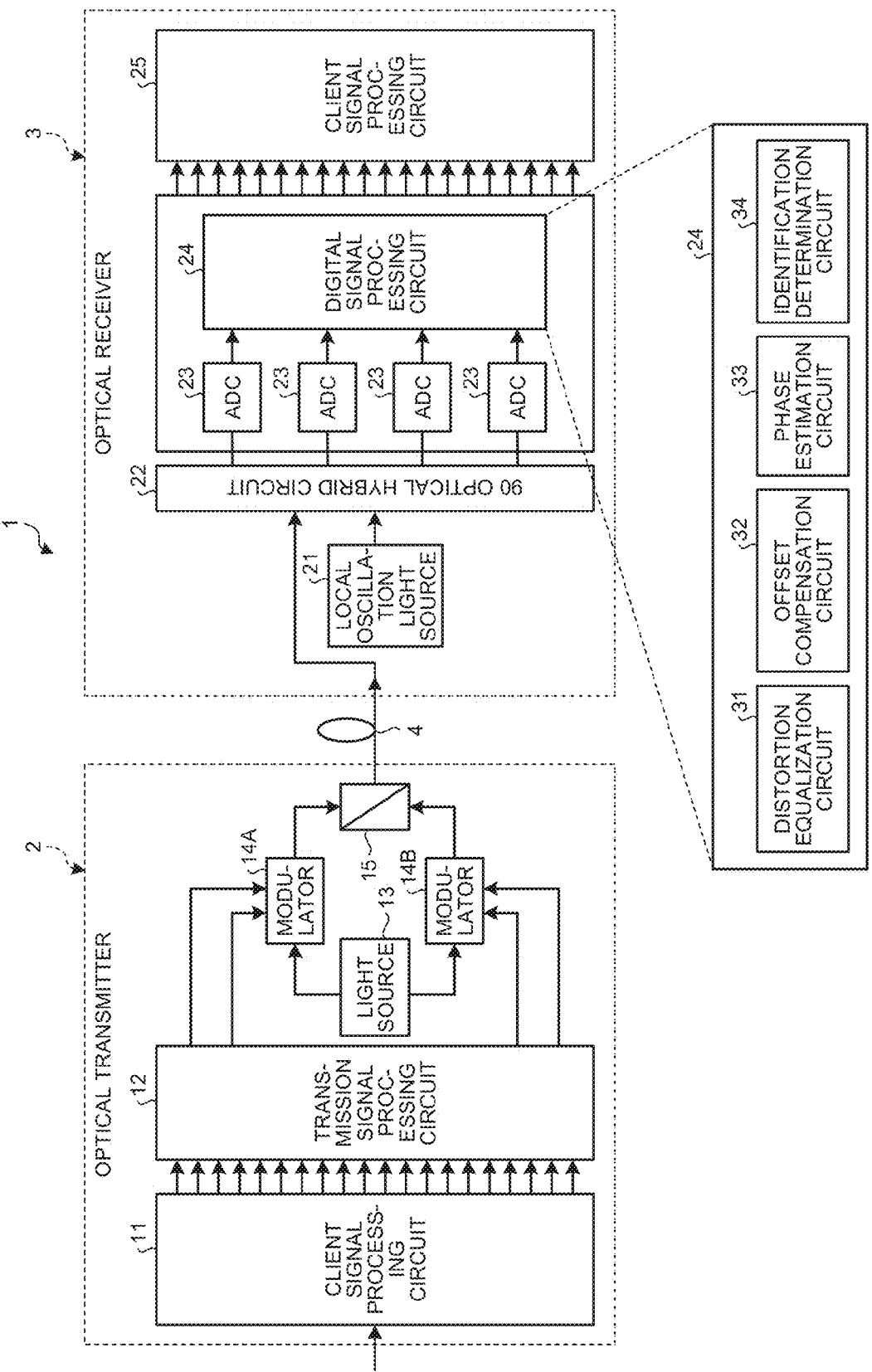
FIG. 1 is a block diagram illustrating an example of an optical transmission system.

FIG. 1 is a block diagram illustrating an example of an optical transmission system. An optical transmission system 1 includes an optical transmitter 2, an optical receiver 3, and an optical line 4 connecting between the optical transmitter 2 and the optical receiver 3. The optical transmitter 2 includes a client signal processing circuit 11, a transmission signal processing circuit 12, a light source 13, modulators 14A and 14B, and a photocoupler 15. The client signal processing circuit 11 is a circuit that performs a client signal process on, for example, a client signal of 100 GbE. The transmission signal processing circuit 12 is a circuit that provides a transmission signal by performing a transmission signal process on the client signal processed in the client signal processing circuit 11. The light source 13 is, for example, a laser diode or the like outputting conveying light. The modulator 14A modulates the conveying light from the light source 13 with the signal light of the transmission signal and outputs the optical signal of X-polarization to the photocoupler 15. The modulator 14B modulates the conveying light from the light source 13 with the signal light of the transmission signal and outputs the optical signal of Y-polarization to the photocoupler 15. The photocoupler 15 synthesizes the optical signal of X-polarization and the optical signal of Y-polarization, and outputs the synthesized signal to the optical line 4.

The optical receiver 3 includes a local oscillation light source 21, a 90° optical hybrid circuit 22, Analog Digital Converters (ADCs) 23, a digital signal processing circuit 24, and a client signal processing circuit 25. The local oscillation light source 21 is, for example, a laser diode or the like outputting the oscillation light. The 90° optical hybrid circuit 22 converts the optical signals of the I component of the X-polarization and the Y-polarization obtained by mixing with the optical signal received without delaying the phase of the oscillation light into the electric signals. Moreover, the 90° optical hybrid circuit 22 converts the optical signals of the Q component obtained by mixing with the optical signal received while delaying the phase of the oscillation light into the electric signals. Each of the ADCs 23 converts the electric signals into digital signals. The digital signal processing circuit 24 is a circuit that performs various digital signal processes on the digitized electric signals. Moreover, the client signal processing circuit 25 performs the client signal process on the electric signals, which are subjected to the various digital signal processes, and outputs the client signals.

The digital signal processing circuit 24 includes a distortion equalization circuit 31, an offset compensation circuit 32, a phase estimation circuit 33, and an identification determination circuit 34. The distortion equalization circuit 31 is a circuit that compensates the distortion component of the optical signal that is generated on the optical line 4. The offset compensation circuit 32 is a circuit that compensates the frequency offset amount between the optical signal and the oscillation light.

The phase estimation circuit 33 estimates the phase component $\theta c$ of the conveying light from the optical signal and removes the phase component $\theta c$ of the conveying light from the optical signal, thereby extracting the phase component $\theta s$ of the signal light. Then, based on the phase component $\theta s$ of the extracted signal light, the phase estimation circuit 33 specifies the position of the signal point from the symbol. The identification determination circuit 34 identifies and determines the bit error of the symbol point, for example, based on the result of specifying the position of the signal point.

Figure 2:
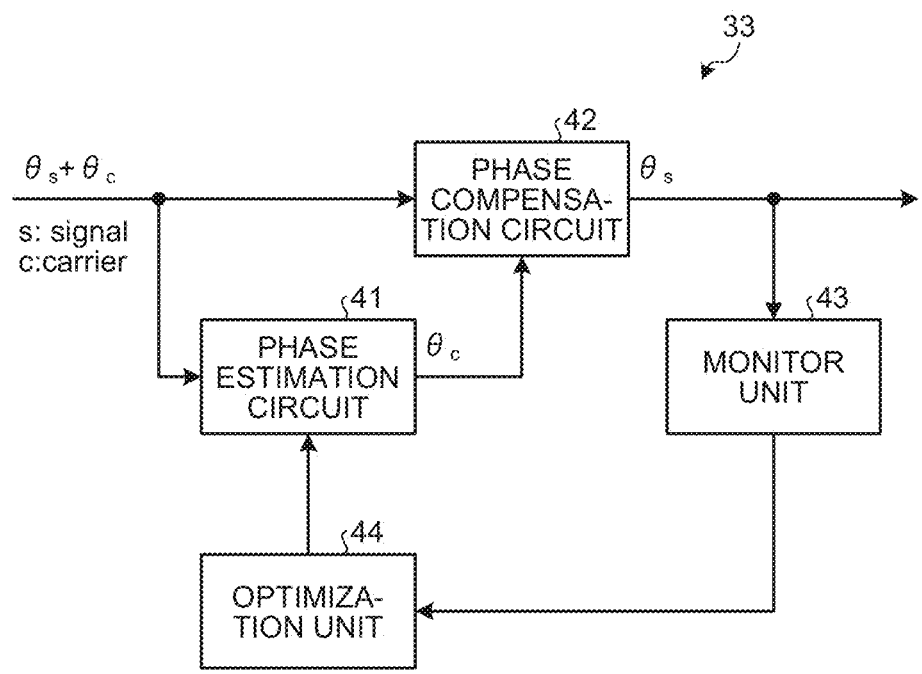
FIG. 2 is an explanatory view illustrating an example of a phase estimation circuit.

FIG. 2 is an explanatory view illustrating an example of the phase estimation circuit 33. The phase estimation circuit 33 in FIG. 2 includes a phase estimation unit 41, a phase compensation unit 42, a monitor unit 43, and an optimization unit 44. The phase estimation unit 41 estimates the phase component $\theta c$ of the conveying light from the optical signal as the reception signal. Note that the reception signal is the optical signal in which the frequency offset component is compensated in the offset compensation circuit 32. The phase compensation unit 42 extracts the phase component $\theta s$ of the signal light superimposed on the phase component $\theta c$ of the conveying light of the reception signal based on the phase component $\theta c$ of the conveying light estimated in the phase estimation unit 41. The monitor unit 43 specifies the signal point of the symbol based on the phase component $\theta s$ of the signal light extracted in the phase compensation unit 42. Based on the signal distribution of the signal points specified in the monitor unit 43, the optimization unit 44 controls the phase estimation unit 41 for optimizing the average length of the phase estimation unit 41.

Figure 3:
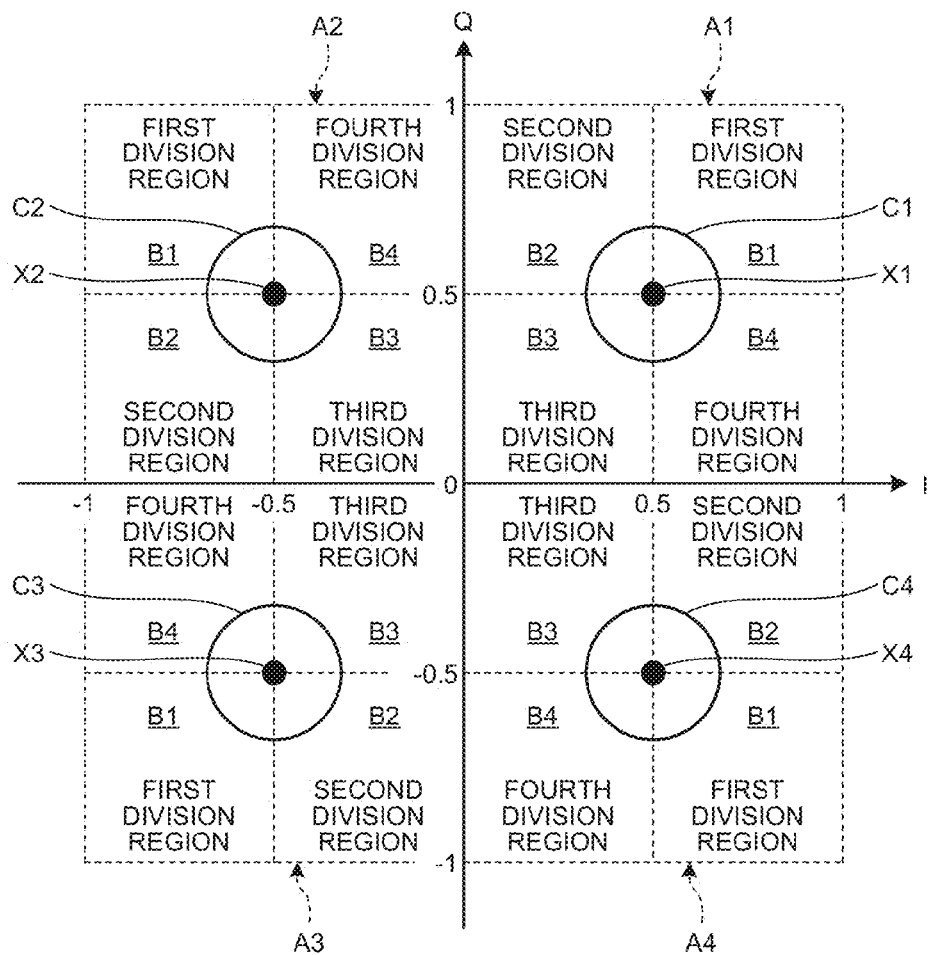
FIG. 3 is an explanatory view illustrating an example of the constellation of QPSK method according to a first embodiment.

FIG. 3 is an explanatory view illustrating an example of the constellation of the QPSK method according to the first embodiment. In FIG. 3, the I component of the in-phase axis and the Q component of the quadrature axis are orthogonal, and the first quadrant A1, the second quadrant A2, the third quadrant A3, and the fourth quadrant A4 are present around the origin coordinates (I, Q)=(0, 0). Moreover, the quadrants are disposed counterclockwise around the origin coordinates (I, Q)=(0, 0) in the order of the first quadrant A1, the second quadrant A2, the third quadrant A3, and the fourth quadrant A4.

The symbol center coordinates X1 of the first quadrant A1 is (I, Q)=(+0.5, +0.5). The first quadrant A1 includes the first symbol region C1 around the symbol center coordinates X1. The symbol center coordinates X2 of the second quadrant A2 are (I, Q)=(−0.5, +0.5). The second quadrant A2 includes the second symbol region C2 around the symbol center coordinates X2. The symbol center coordinates X3 of the third quadrant A3 is (I, Q)=(−0.5, −0.5). The third quadrant A3 includes the third symbol region C3 around the symbol center coordinates X3. The symbol center coordinates X4 of the fourth quadrant A4 is (I, Q)=(+0.5, −0.5). The fourth quadrant A4 includes the fourth symbol region C4 around the symbol center coordinates X4.

The first quadrant A1 including the first symbol region C1 is divided into a first division region B1, a second division region B2, a third division region B3, and a fourth division region B4 around the symbol center coordinates X1. Note that the first division region B1 is a region located the farthest from the origin coordinates (0, 0). The first division region B1, the second division region B2, the third division region B3, and the fourth division region B4 are disposed in this order counterclockwise around the symbol center coordinates X1. Moreover, in each of the second quadrant A2 including the second symbol region C2, the third quadrant A3 including the third symbol region C3, and the fourth quadrant A4 including the fourth symbol region C4, the first division region B1, the second division region B2, the third division region B3, and the fourth division region B4 are divisionally disposed.

Based on the monitor results obtained by the monitor unit 43, the first quadrant A1 including the first symbol region C1 is the target to be monitored, and the optimization unit 44 monitors the signal points classified in the first quadrant A1 including the first symbol region C1. Note that the quadrant to be monitored can be specified from among the first quadrant A1 to the fourth quadrant A4. In the first embodiment, the quadrant to be monitored is the first quadrant A1 for the convenience of the description. In this case, each of the second quadrant A2, the third quadrant A3, and the fourth quadrant A4 does not need to be divided into the division regions B1 to B4. The optimization unit 44 further serves as, for example, an accumulating unit that accumulates the number of signal points classified in the unit of the first division region B1, the second division region B2, the third division region B3, and the fourth division region B4 in the first quadrant A1 to be monitored.

When the n-th signal point belongs to the first quadrant A1, the optimization unit 44 classifies the signal point in any of the first division region B1, the second division region B2, the third division region B3, and the fourth division region B4 in the first quadrant A1. Note that when the n-th signal point is In≥Ic and Qn≥Qc, the optimization unit 44 classifies the n-th signal point in the first division region B1 and increments the signal score by one. When the n-th signal point is In<Ic and Qn≤Qc, the optimization unit 44 classifies the n-th signal point in the second division region B2 and increments the signal score by one. When the n-th signal point is In<Ic and Qn<Qc, the optimization unit 44 classifies the n-th signal point in the third division region B3 and increments the signal score by one. When the n-th signal point is In ≥Ic and Qn<Qc, the optimization unit 44 classifies the n-th signal point in the fourth division region B4 and increments the signal score by one.

The optimization unit 44 adds the signal score of the first division region B1 and the signal score of the third division region B3, thereby calculating the first signal point α. Further, the optimization unit 44 adds the signal score of the second division region B2 and the signal score of the fourth division region B4, thereby calculating the second signal point β. The adjustment amount TH is, for example, 10% of the signal scores of the entire first quadrant A1 to be monitored.

Figure 4:
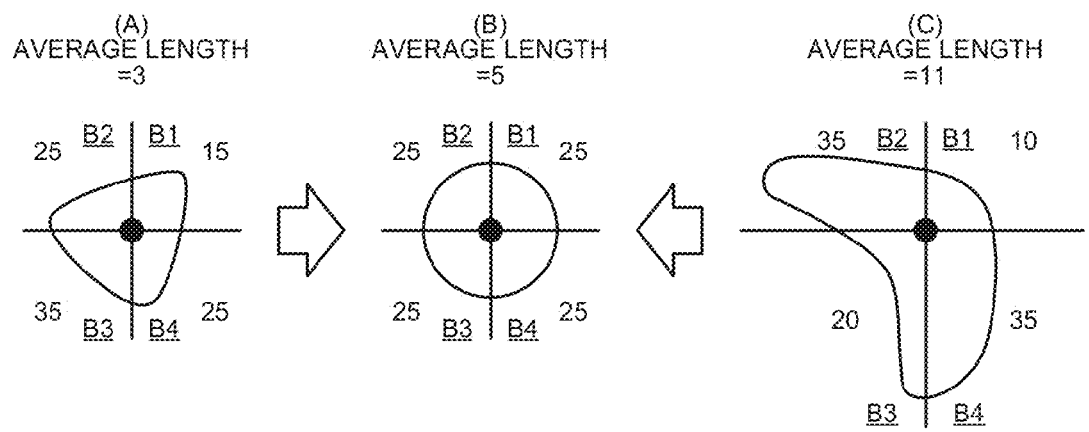
FIG. 4 is an explanatory view illustrating an example of the signal score in each division region in a first quadrant according to the first embodiment.

When the condition of α≥(β+TH) holds, the optimization unit 44 determines that the constellation shape is the shape as illustrated in FIG. 4A in which the signal scores in the second division region B2 and the fourth division region B4 are substantially equal, the signal score in the first division region B1 is extremely low, the signal score in the third division region B3 is extremely high. The optimization unit 44 is, for example, a determination unit that determines the constellation shape as a triangular shape. Upon the determination of the constellation shape as being triangular, the optimization unit 44 determines that, in the current state, the average length of the phase estimation unit 41 is as short as "3" and the BER is high. As a result, upon the determination of the constellation shape as being triangular, the optimization unit 44 sets the average length of the phase estimation unit 41 to be as long as "5", for example. The optimization unit 44 is, for example, a controller. The phase estimation unit 41 lengthens the average length based on the content of the setting of the optimization unit 44.

When the condition of β≥(α+TH) holds, the optimization unit 44 determines that the constellation shape is the shape as illustrated in FIG. 4C in which the signal scores in the second division region B2 and the fourth division region B4 are larger than the signal scores in the first division region B1 and the third division region B3. The optimization unit 44 determines that the constellation shape is the shape deformed to be close to the signal point distribution of another adjacent quadrant. Upon the determination of the constellation shape as being the deformed shape, the optimization unit 44 determines that in the current state, the average length of the phase estimation unit 41 is as long as "11" and the BER is high. As a result, upon the determination of the constellation shape as being the deformed shape, the optimization unit 44 sets the average length of the phase estimation unit 41 to be as short as "5", for example. The phase estimation unit 41 shortens the average length based on the content of the setting of the optimization unit 44.

When the condition of −TH<(α−β)<TH holds, the optimization unit 44 determines that the constellation shape is circular as illustrated in FIG. 4B because the signal scores in the first division region B1, the second division region B2, the third division region B3, and the fourth division region B4 are substantially equal. Upon the determination of the constellation shape as being circular, the optimization unit 44 determines that in the current state, the average length of the phase estimation unit 41 is optimally "5" and the BER is low. As a result, upon the determination of the constellation shape as being circular, the optimization unit 44 maintains the current setting with regard to the average length of the phase estimation unit 41. The phase estimation unit 41 maintains the current average length to be "5", for example, based on the content of the setting of the optimization unit 44.

Figure 5A:
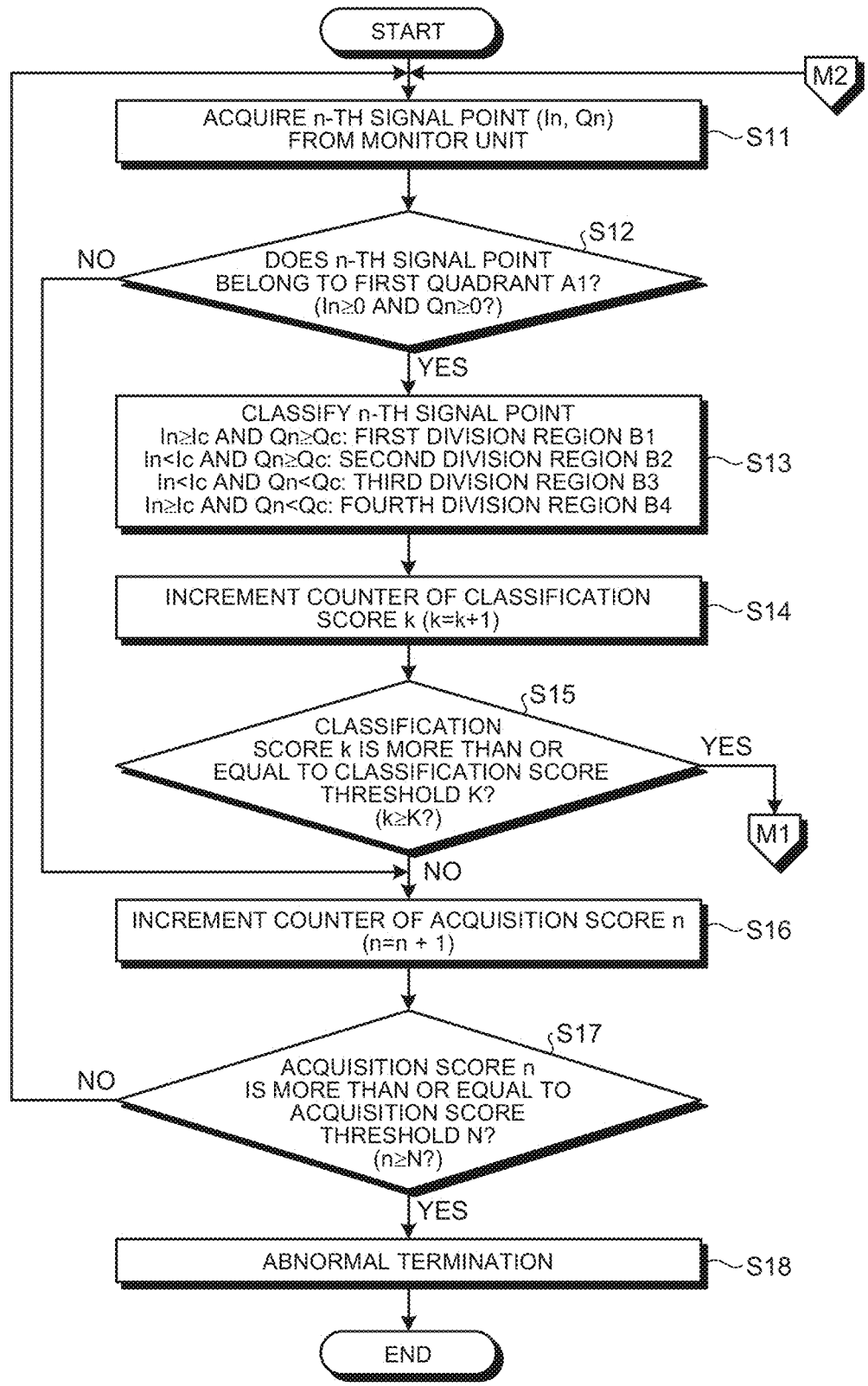
FIG. 5A is a flowchart illustrating an example of a process operation of an optimization unit related to the average length setting process of the first embodiment.

Next, the operation of the optical receiver 3 in the optical transmission system 1 of the first embodiment is described. FIG. 5A and FIG. 5B are flowcharts each illustrating an example of a process operation of the optimization unit 44 related to the average length setting process according to the first embodiment. In the average length setting process, the signal scores in the first division region B1, the second division region B2, the third division region B3, the fourth division region B4 in the first quadrant A1 are accumulated and based on the result of the accumulation, the constellation shape is determined. In addition, the average length setting process is a process of setting the average length of the phase estimation unit 41 based on this determination result.

In FIG. 5A, the optimization unit 44 acquires the coordinates (In, Qn) of the n-th signal point from the monitor unit 43 (Step S11). The optimization unit 44 determines whether the n-th signal point belongs to the first quadrant A1 (Step S12). The process of determining whether the n-th signal point belongs to the first quadrant A1 is performed by determining whether the signal point is at the coordinates in the first quadrant A1 that satisfy In ≥0 and Qn≥0.

When the n-th signal point belongs to the first quadrant A1 (Yes in Step S12), the optimization unit 44 classifies the n-th signal point in any of the first division region B1, the second division region B2, the third division region B3, and the fourth division region B4 in the first quadrant A1 (Step S13). Note that when the n-th signal point is In≥Ic and Qn≥Qc, the optimization unit 44 classifies the n-th signal point in the first division region B1 and increments the signal score by one. When the n-th signal point is In<Ic and Qn≥Qc, the optimization unit 44 classifies the n-th signal point in the second division region B2 and increments the signal score by one. When the n-th signal point is In<Ic and Qn<Qc, the optimization unit 44 classifies the n-th signal point in the third division region B3 and increments the signal score by one. When the n-th signal point is In≥Ic and Qn<Qc, the optimization unit 44 classifies the n-th signal point in the fourth division region B4 and increments the signal score by one.

When the signal point is classified in Step S13, the optimization unit 44 increments the value in the counter for the classification score k by one (Step S14). The optimization unit 44 determines whether the classification score k is more than or equal to the classification score threshold K (Step S15). Note that the classification score threshold K is the sample upper-limit threshold of the classified signal scores, and is "9000", for example.

When the classification score k is not more than or equal to the classification score threshold K (No in Step S15), the optimization unit 44 increments the counter of the acquisition score n in Step S11 by one (Step S16), and determines whether the acquisition score n is more than or equal to the acquisition score threshold N (Step S17). Note that the acquisition score threshold N is the sample upper-limit threshold of the acquired signal scores, and is "40000", for example.

When the acquisition score n is not more than or equal to the acquisition score threshold N (No in Step S17), the optimization unit 44 proceeds to Step S11 for acquiring the next signal point, i.e., the n-th signal point in the monitor unit 43. When the acquisition score n is more than or equal to the acquisition score threshold N (Yes in Step S17), the optimization unit 44 determines that the value exceeds the sample upper-limit threshold of the acquired signal scores and causes abnormal termination (Step S18), thereby terminating the process operation illustrated in FIG. 5A.

When the n-th signal point does not belong to the first quadrant (No in Step S12), the optimization unit 44 proceeds to Step S16 for incrementing the acquisition score by one. When the classification score k is more than or equal to the classification score threshold K (Yes in Step S15), the optimization unit 44 proceeds to M1 illustrated in FIG. 5B.

In M1 in FIG. 5B, the optimization unit 44 estimates the constellation shape of the signal points from the score distribution of the signal points (Step S19). According to the optimization unit 44, the first signal score $\alpha$ is obtained by adding the signal score of the first division region B1 and the signal score of the third division region B3, and the second signal score $\beta$ is obtained by adding the signal score of the second division region B2 and the signal score of the fourth division region B4. When the condition of $\alpha \geq (\beta+TH)$ holds, the optimization unit 44 determines the constellation shape of the first quadrant A1 as being triangular as illustrated in FIG. 4A. When the condition of $\beta \geq (\alpha+TH)$ holds, the optimization unit 44 determines the constellation shape of the first quadrant A1 as being the deformed shape as illustrated in FIG. 4C. When the condition of $-TH<(\alpha-\beta)<TH$ holds, the optimization unit 44 determines the constellation shape of the first quadrant A1 as being circular as illustrated in FIG. 4B.

When the result of estimating the constellation shape of the first quadrant A1 in Step S19 indicates that the constellation shape is triangular (Step S20), the optimization unit 44 determines to lengthen the average length of the phase estimation unit 41 (Step S21). Reflecting the average length of the phase estimation unit 41 based on the result of determining the average length (Step S22), the optimization unit 44 increments the counter of the number of repeats r by one (Step S23). The optimization unit 44 determines whether the number of repeats r is more than or equal to the threshold of the number of repeats R (Step S24). Note that the threshold of the number of repeats R is, for example, the upper-limit threshold of the number of repeats r from the start of the activation of the optical receiver 3, and is, for example, 10. The timing is not limited to the start of the activation of the optical receiver 3 and the activation may be carried out for every predetermined timing period.

The optimization unit 44 terminates the process operation illustrated in FIG. 5A when the number of repeats r is more than or equal to the threshold of the number of repeats R (Yes in Step S24). When the number of repeats r is not more than or equal to the threshold of the number of repeats R (No in Step S24), the optimization unit 44 proceeds to M2 in FIG. 5A.

When the constellation shape is a deformed shape expanding from the center in Step S20, the optimization unit 44 determines to shorten the average length (Step S25), and for reflecting the average length based on the result of determining the average length, the optimization unit 44 proceeds to Step S22. When the constellation shape is the circular shape in Step S20, the optimization unit 44 determines to maintain the average length (Step S26), and for reflecting the average length based on the result of determining to maintain the average length, the optimization unit 44 proceeds to Step S22.

In FIG. 5A, the optimization unit 44 divides the first quadrate A1 including the first symbol region C1 into the first to fourth division regions B1 to B4, and accumulates the classification scores of the signal points in each of the division regions B1 to B4. Further, the optimization unit 44 estimates the constellation shape in the first quadrate A1 based on the accumulated classification scores of the signal points in each of the division regions B1 to B4. As a result, the optimization unit 44 can estimate the constellation shape in the first quadrate A1 correctly.

In addition, when the constellation shape is estimated as being triangular, the optimization unit 44 lengthens the average length of the phase estimation unit 41 to optimize the average length. As a result, the phase estimation unit 41 can reduce the BER by optimizing the average length, thereby calculating the phase noise highly accurately.

When the constellation shape is estimated as being the deformed shape, the optimization unit 44 shortens the average length of the phase estimation unit 41 to optimize the average length. As a result, the phase estimation unit 41 can reduce the BER by optimizing the average length, thereby calculating the phase noise highly accurately.

When the constellation shape is estimated as being circular, the optimization unit 44 determines that the average length is optimum state, and maintains the average length. As a result, the phase estimation unit 41 can reduce the BER by optimizing the average length, thereby calculating the phase noise highly accurately.

In the first embodiment, the optimization unit 44 divides the first quadrate A1 including the first symbol region C1 into the first to fourth division regions B1 to B4 and accumulates the classification scores of the signal points in the unit of each of the division regions B1 to B4. Moreover, the optimization unit 44 estimates the constellation shape in the first quadrate A1 based on the accumulated classification scores of the signal points in each of the division regions B1 to B4. As a result, the optimization unit 44 can estimate the constellation shape in the first quadrate A1 correctly.

When the constellation shape is estimated as being triangular, the optimization unit 44 lengthens the average length to optimize the average length. As a result, the phase estimation unit 41 can reduce the BER by optimizing the average length, thereby calculating the phase noise highly accurately.

When the constellation shape is estimated as being the deformed shape, the optimization unit 44 shortens the average length to optimize the average length. As a result, the phase estimation unit 41 can reduce the BER by optimizing the average length, thereby calculating the phase noise highly accurately.

When the constellation shape is estimated as being circular, the optimization unit 44 determines that the average length is optimum state and maintains the average length. As a result, the phase estimation unit 41 can reduce the BER by optimizing the average length, thereby calculating the phase noise highly accurately.

In the first embodiment, the first quadrate A1 including the first symbol region C1 is divided into four division regions B1 to B4 around the symbol center coordinates X1; however, the first quadrate A1 may alternatively be divided into three division regions B11 to B13 around the symbol center coordinates X1. An embodiment in this case is described with regard to the optical receiver 3 in a second embodiment. The same structure as the optical receiver 3 in the first embodiment is denoted by the same reference symbol and the description of the same structure and operation is omitted.

[b] Second embodiment

Figure 6:
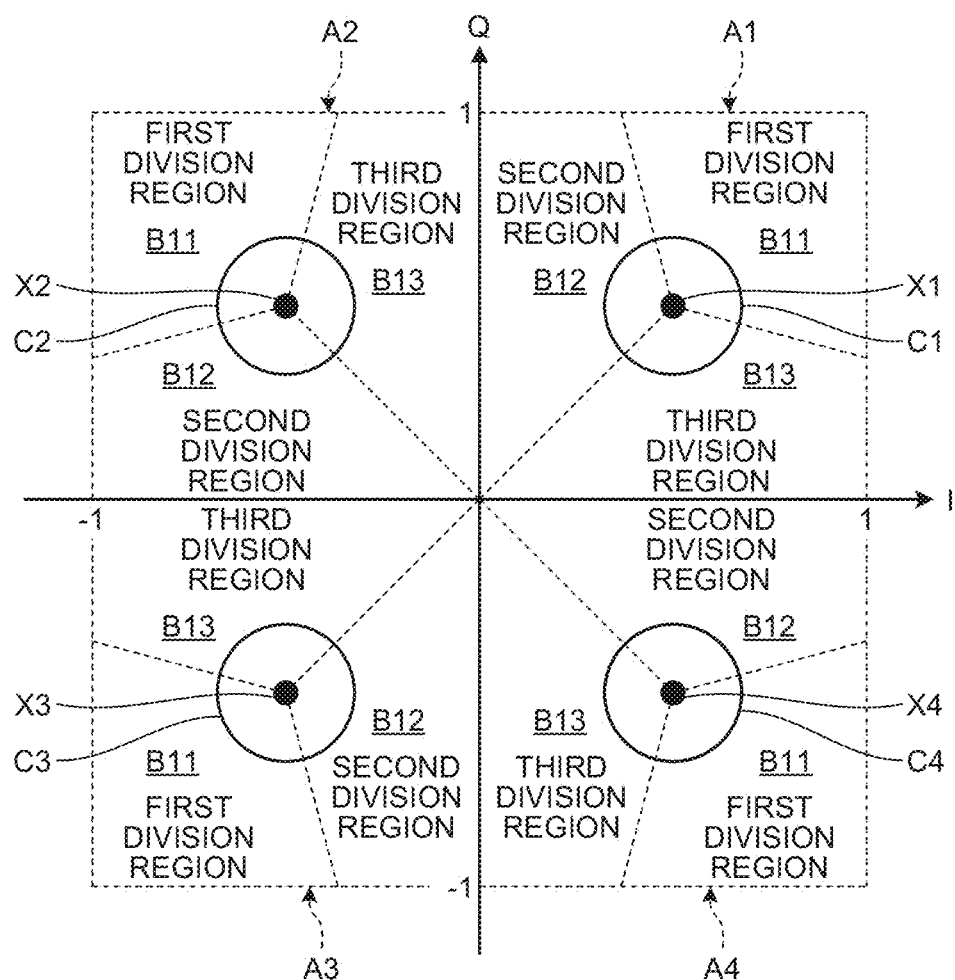
FIG. 6 is an explanatory view illustrating an example of the constellation of QPSK of a second embodiment.

FIG. 6 is an explanatory view illustrating an example of the constellation of QPSK in the second embodiment. The first quadrate A1 including the first symbol region C1 in the constellation illustrated in FIG. 6 is divided into a first division region B11, a second division region B12, and a third division region B13 around the symbol center coordinates X1. Note that the first division region B11 is a region the farthest from the origin coordinates (0, 0). In the first quadrate A1, the first division region B11, the second division region B12, and the third division region B13 are disposed in this order counterclockwise around the symbol center coordinates X1. Each of the second quadrate A2 including the second symbol region C2 and the third quadrate A3 including the third symbol region C3, moreover, is divided into the first division region B11, the second division region B12, and the third division region B13.

Based on the monitor result of the monitor unit 43, the first quadrate A1 including the first symbol region C1 is the target to be monitored, and the optimization unit 44 monitors the signal points classified in the first quadrate A1 including the first symbol region C1. The quadrate to be monitored can be specified from among the first quadrate A1 to the forth quadrate A4. In the second embodiment, the quadrant to be monitored is the first quadrant A1 for the convenience of the description. In this case, each of the second quadrate A2, the third quadrate A3, and the fourth quadrate A4 does not need to be divided into the division regions B1 to B3. Moreover, the optimization unit 44 accumulates the number of signal points classified in the unit of the first division region B11, the second division region B12, and the third division region B13 in the first quadrate A1 to be monitored.

When the n-th signal point belongs to the first quadrant A1, the optimization unit 44 classifies the signal point in any one of the first division region B11, the second division region B12, and the third division region B13 in the first quadrate A1. Note that the optimization unit 44 calculates the inclination of the line connecting the symbol center coordinates X1 and the coordinates of the signal point, and decides with reference to the angle range of each division region. For example, when the n-th signal point satisfies In≥Ic, θ=arctan {(Qn−Qc)/(In−Ic)}, and −6π/12≤θ<−π/12, the optimization unit 44 classifies the n-th signal point in the third division region B13 and increments the signal score by one. When the n-th signal point satisfies In≥Ic, θ=arctan {(Qn−Qc)/(In−Ic)}, and −π/12≤θ≤6π/12, the optimization unit 44 classifies the n-th signal point in the first division region B11 and increments the signal score by one.

When the n-th signal point satisfies In<Ic, θ=arctan {(Qc−Qn)/(Ic−In)}, and −6 π/12≤θ≤−5π/12, the optimization unit 44 classifies the n-th signal point in the first division region B11 and increments the signal score by one. When the n-th signal point satisfies In<Ic, θ=arctan {(Qc−Qn)/(Ic−In)}, and −5π/12≤θ<3π/12, the optimization unit 44 classifies the n-th signal point in the second division region B12 and increments the signal score by one. When the n-th signal point satisfies In<Ic, θ=arctan {(Qc−Qn)/(Ic−In)}, and 3π/12≤θ<6π/12, the optimization unit 44 classifies the n-th signal point in the third division region B13 and increments the signal score by one.

The optimization unit 44 calculates the third signal score α1 by doubling the signal score of the first division region B11. Furthermore, the optimization unit 44 calculates the fourth signal score β1 by adding the signal score of the second division region B12 and the signal score of the third division region B13. Note that the adjustment amount TH is, for example, 10% of the signal scores of the entire first quadrant A1 to be monitored.

Figure 8:
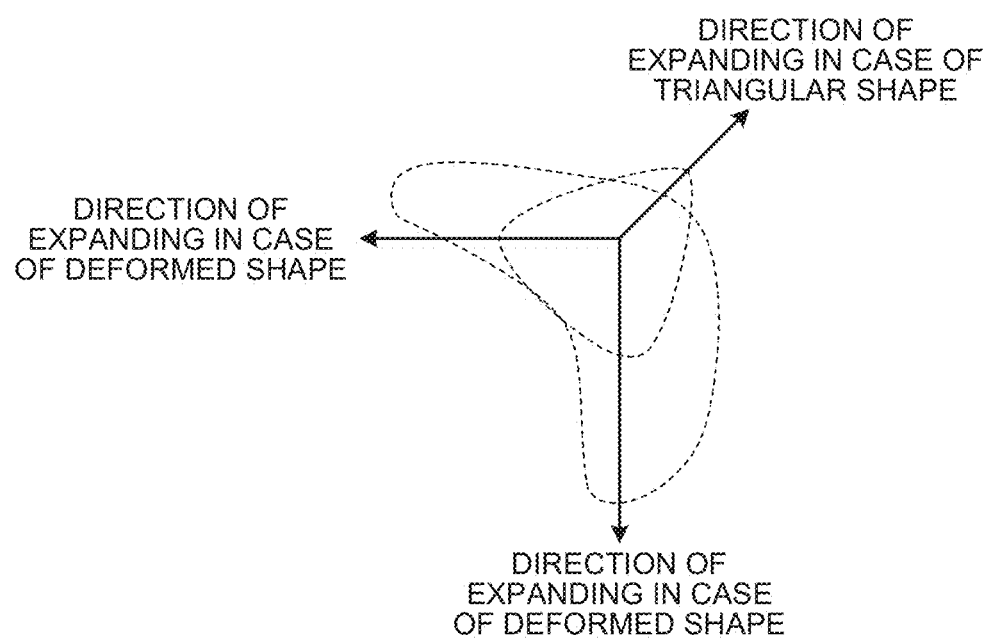
FIG. 8 is an explanatory view illustrating an example of the constellation shape in the second embodiment.

When the condition of α1≥(β1+TH) holds, the optimization unit 44 determines that the constellation shape is triangular as illustrated in FIG. 8. When the constellation shape is determined as being triangular, the optimization unit 44 determines that, in the current state, the average length of the phase estimation unit 41 is short and the BER is high. As a result, when the constellation shape is determined as being triangular, the optimization unit 44 sets to lengthen the average length of the phase estimation unit 41. The phase estimation unit 41 lengthens the average length based on the content of the setting of the optimization unit 44.

When the condition of β1≥(α1+TH) holds, the optimization unit 44 determines that the constellation shape is the shape deformed to be close to the signal point distribution of another adjacent quadrant as illustrated in FIG. 8. Then, when the constellation shape is determined as being the deformed shape, the optimization unit 44 determines that, in the current state, the average length of the phase estimation unit 41 is long and the BER is high. As a result, when the constellation shape is determined as being the deformed shape, the optimization unit 44 sets to shorten the average length of the phase estimation unit 41. The phase estimation unit 41 shortens the average length based on the content of the setting of the optimization unit 44.

When the condition of −TH<(α1−β1)<TH holds, the optimization unit 44 determines that the constellation shape is circular. Then, when the constellation shape is determined as being circular, the optimization unit 44 determines that, in the current state, the average length of the phase estimation unit 41 is optimum and the BER is low. As a result, when the constellation shape is determined as being circular, the optimization unit 44 maintains the current setting with regard to the average length of the phase estimation unit 41. The phase estimation unit 41 maintains the current average length based on the content of the setting of the optimization unit 44.

Figure 7A:
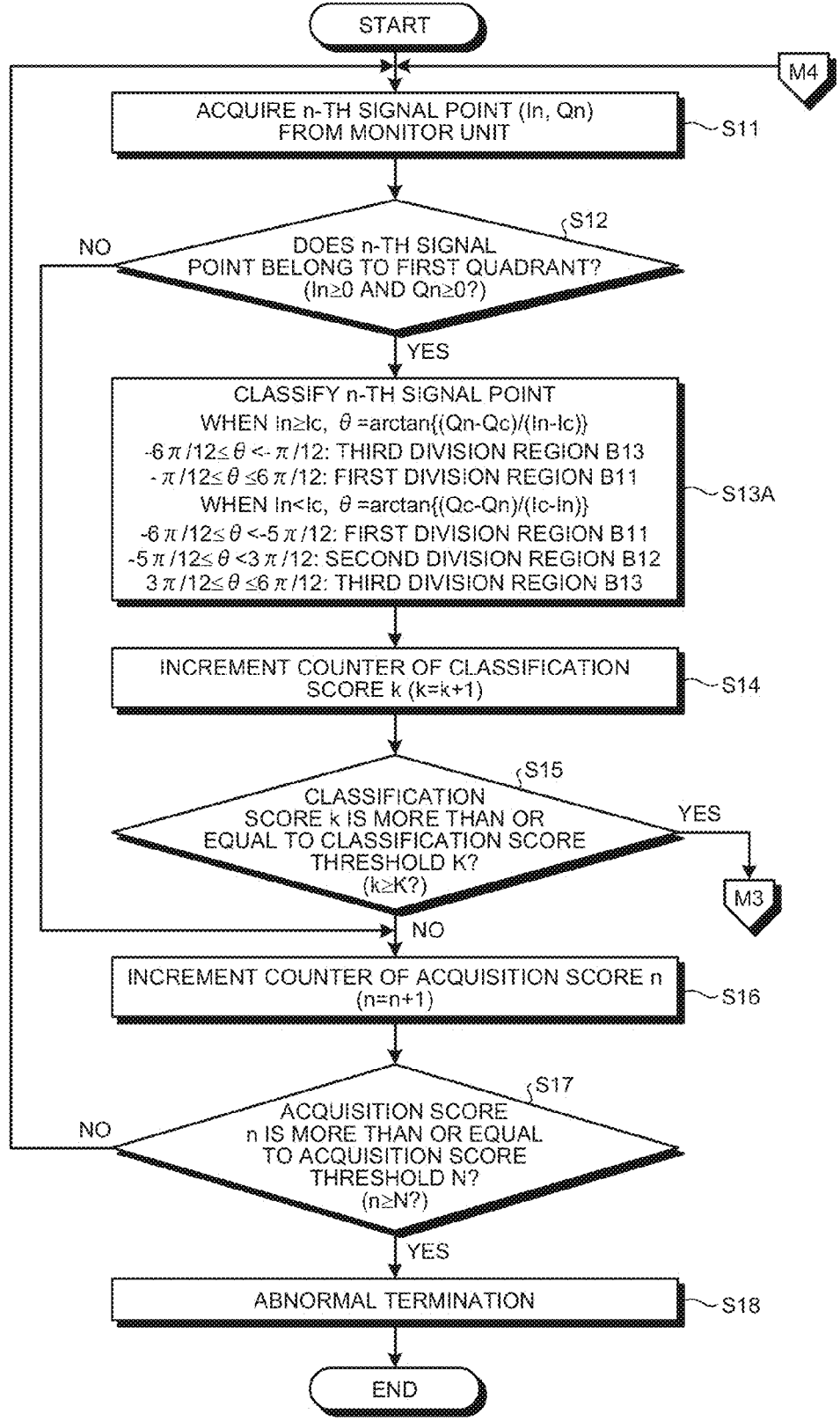
FIG. 7A is a flowchart illustrating an example of a process operation of an optimization unit related to the average length setting process of the second embodiment.

Next, the operation of the optical receiver 3 in the optical transmission system 1 of the second embodiment is described. FIG. 7A and FIG. 7B are flowcharts each illustrating an example of a process operation of the optimization unit 44 related to the average length setting process according to the second embodiment. In the average length setting process, the signal scores in the first division region B11, the second division region B12, and the third division region B13 in the first quadrant A1 are accumulated and based on the result of the accumulation, the constellation shape is determined; then, based on the determination result, the average length of the phase estimation unit 41 is set.

In FIG. 7A, when the n-th signal point belongs to the first quadrate A1 (Yes in Step S12), the optimization unit 44 classifies the signal point in any of the first division region B11, the second division region B12, and the third division region B13 (Step S13A). Note that when the n-th signal point satisfies In≥Ic, θ=arctan {(Qn−Qc)/(In−Ic)}, and −6π/12≤θ<−π/12, the optimization unit 44 classifies the n-th signal point in the third division region B13 and increments the signal score by one. When the n-th signal point satisfies In≥Ic, θ=arctan {(Qn−Qc)/(In−Ic)}, and −π/12≤θ≤6π/12, the optimization unit 44 classifies the n-th signal point in the first division region B11 and increments the signal score by one. When the n-th signal point satisfies In<Ic, θ=arctan {(Qc−Qn)/(Ic−In)}, and −6π/12≤θ<−5π/12, the optimization unit 44 classifies the n-th signal point in the first division region B11 and increments the signal score by one. When the n-th signal point satisfies In<Ic, θ=arctan {(Qc−Qn)/(Ic−In)}, and −5π/12≤θ<3π/12, the optimization unit 44 classifies the n-th signal point in the second division region B12 and increments the signal score by one. When the n-th signal point satisfies In<Ic, θ=arctan {(Qc−Qn)/(Ic−In)}, and 3π/12≤θ<6π/12, the optimization unit 44 classifies the n-th signal point in the third division region B13 and increments the signal score by one.

After the n-th signal point is classified in the first division region B11, the second division region B12, and the third division region B13 in the first quadrate A1 in Step S13A, the optimization unit 44 executes the process operation of Step S14 to Step S18.

In M3 of FIG. 7B, when the classification score is more than or equal to the classification score threshold in Step S15 (Yes in Step S15), the optimization unit 44 estimates the constellation shape of the signal points from the score distribution of the signal points (Step S19A). The optimization unit 44 calculates the third signal score al by doubling the signal score of the first division region B11 and the second signal score β1 by adding the signal score of the second division region B12 and the signal score of the third division region B13. When the condition of α1≥(β1+TH) holds, the optimization unit 44 determines that the constellation shape of the first quadrate A1 is triangular. When the condition of β1≥(α1+TH) holds, the optimization unit 44 determines that the constellation shape of the first quadrate A1 is the deformed shape. When the condition of −TH< (α1−β1)<TH holds, the optimization unit 44 determines that the constellation shape of the first quadrate A1 is circular.

Then, based on the result of estimating the constellation shape of the first quadrant A1 in Step S19A, the optimization unit 44 executes the process operation of Step S20 to Step S26. Note that when the number of repeats r is more than or equal to the threshold of the number of repeats R (Yes in Step S24), the optimization unit 44 proceeds to M4 in FIG. 7A.

The optimization unit 44 divides the first quadrate A1 including the first symbol region C1 into the first to third division regions B11 to B13, and accumulates the classification scores of the signal points in the unit of each of the division regions B11 to B13. Moreover, the optimization unit 44 estimates the constellation shape in the first quadrate A1 based on the accumulated classification scores of the signal points in each of the division regions B11 to B13. As a result, the optimization unit 44 can estimate the constellation shape in the first quadrate A1 correctly.

When the constellation shape is estimated as being triangular, the optimization unit 44 lengthens the average length of the phase estimation unit 41 to optimize the average length. As a result, the phase estimation unit 41 can reduce the BER by optimizing the average length, thereby calculating the phase noise highly accurately.

When the constellation shape is estimated as being the deformed shape, the optimization unit 44 shortens the average length of the phase estimation unit 41 to optimize the average length. As a result, the phase estimation unit 41 can reduce the BER by optimizing the average length, thereby calculating the phase noise highly accurately.

When the constellation shape is estimated as being circular, the optimization unit 44 determines the average length of the phase estimation unit 41 to be optimum state and maintains the average length. As a result, the phase estimation unit 41 can reduce the BER by optimizing the average length, thereby calculating the phase noise highly accurately.

In the second embodiment, the optimization unit 44 divides the first quadrate A1 including the first symbol region C1 into the first to third division regions B11 to B13, and accumulates the classification scores of the signal points in the unit of each of the division regions B11 to B13. Moreover, based on the accumulated classification scores of the signal points in each of the division regions B11 to B13, the optimization unit 44 estimates the constellation shape in the first quadrate A1. As a result, the optimization unit 44 can estimate the constellation shape in the first quadrate A1 correctly.

Further, when the constellation shape is triangular, the optimization unit 44 lengthens the average length of the phase estimation unit 41 to optimize the average length. As a result, the phase estimation unit 41 can reduce the BER by optimizing the average length, thereby calculating the phase noise highly accurately.

When the constellation shape is the deformed shape, the optimization unit 44 shortens the average length of the phase estimation unit 41 to optimize the average length. As a result, the phase estimation unit 41 can reduce the BER by optimizing the average length, thereby calculating the phase noise highly accurately.

Further, when the constellation shape is circular, the optimization unit 44 determines that the average length of the phase estimation unit 41 is optimum state and maintains the average length. As a result, the phase estimation unit 41 can reduce the BER by optimizing the average length, thereby calculating the phase noise highly accurately.

Figure 9:
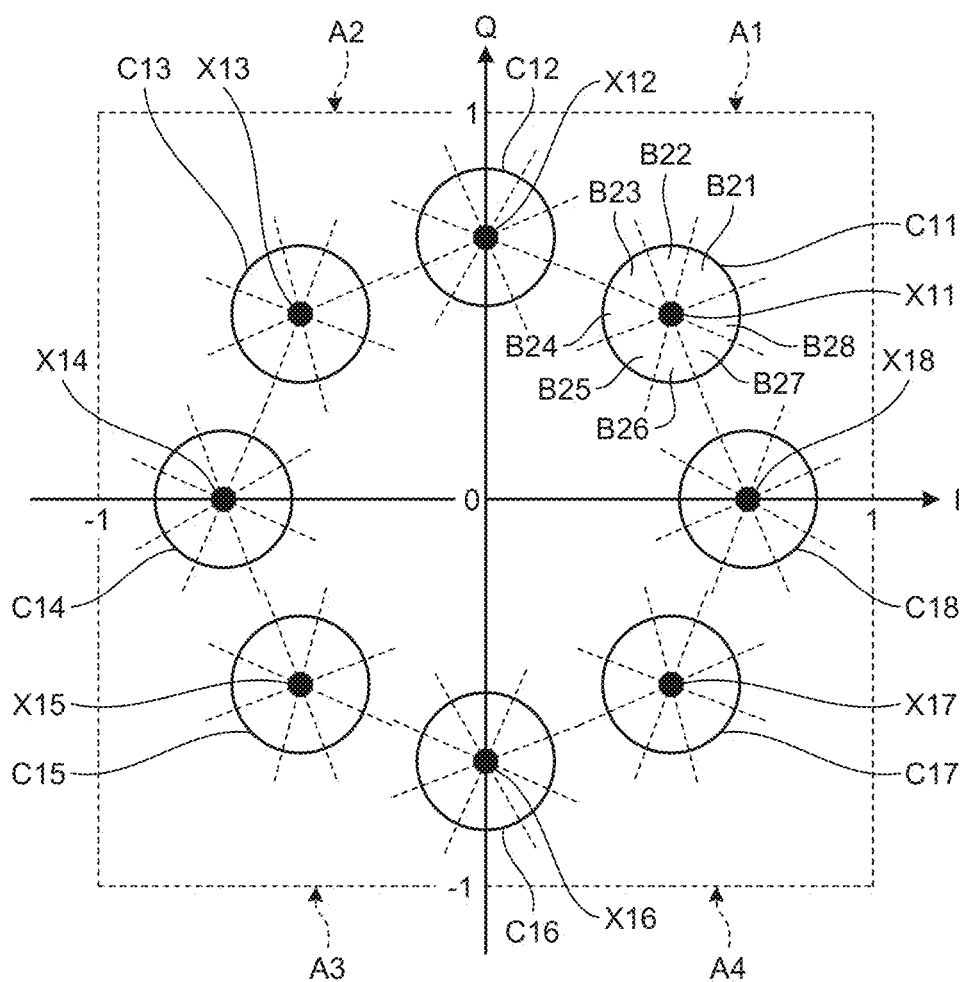
FIG. 9 is an explanatory view illustrating an example of the constellation of the 8PSK method in a third embodiment.

Note that although the first and second embodiments describe the optical receiver 3 of the QPSK signal method, the 8PSK signal method may be employed alternatively; an embodiment of this case is hereinafter described as a third embodiment. FIG. 9 is an explanatory view illustrating an example of the constellation of the 8PSK method according to the third embodiment. The same structure as the optical receiver 3 in the first embodiment is denoted by the same reference symbol and the description of the same structure and operation is omitted.

[c] Third embodiment

The optical receiver 3 of the third embodiment is different from the optical receiver 3 of the first embodiment in that the reception signal of the 8PSK method is received. From the center of each of the symbol center coordinates X1 to X18 of each of the quadrates A1 to A4 of the constellation illustrated in FIG. 9, the region is divided into a first division region B21 to an eighth division region B28. Note that the first division region B21 is the farthest from the origin coordinates (0, 0). In the first symbol region C11, the second division region B22, the third division region B23, the fourth division region B24, the fifth division region B25, the sixth division region B26, the seventh division region B27, and the eighth division region B28 are disposed counterclockwise from the first division region B21 around the symbol center coordinates X11. In each of the second symbol region C12 to the eighth symbol region C18, the first division region B21 to the eighth division region B28 are disposed.

The first symbol region C11 is the target to be monitored, and the optimization unit 44 monitors the signal points classified in the first symbol region C11 based on the result of monitoring of the monitor unit 43. Note that the symbol region to be monitored can be specified from among the first symbol region C11 to the eighth symbol region C18. In the third embodiment, the symbol region to be monitored is the first symbol region C11 for the convenience of the description. In this case, each of the second symbol region C21 to the eighth symbol region C28 does not need to be divided into the division regions B21 to B28. Moreover, the optimization unit 44 accumulates the number of signal points classified in the unit of the first division region B21 to the eighth division region B28 in the first symbol region C11 to be monitored.

When the n-th signal point belongs to the first symbol region C11, the optimization unit 44 classifies the signal point in any of the first division region B21 to the eighth division region B28 in the first symbol region C11.

For example, when the n-th signal point satisfies In≥Ic, $\theta$=arctan $\{(Qn-Qc)/(In-Ic)\}$, and $-4\pi/8 \leq \theta < -3\pi/8$, the optimization unit 44 classifies the n-th signal point in the sixth division region B26 and increments the signal score by one. When the n-th signal point satisfies In≥Ic, $\theta$=arctan $\{(Qn-Qc)/(In-Ic)\}$, and $-3\pi/8 \leq \theta \leq -\pi/8$, the optimization unit 44 classifies the n-th signal point in the seventh division region B27 and increments the signal score by one. When the n-th signal point satisfies In≥Ic, $\theta$=arctan $\{(Qn-Qc)/(In-Ic)\}$, and $-\pi/8 \leq \theta < 3\pi/8$, the optimization unit 44 classifies the n-th signal point in the first division region B21 and increments the signal score by one. When the n-th signal point satisfies In≥Ic, $\theta$=arctan $\{(Qn-Qc)/(In-Ic)\}$, and $3\pi/8 \leq \theta \leq 4\pi/8$, the optimization unit 44 classifies the n-th signal point in the second division region B22 and increments the signal score by one.

Further, when the n-th signal point satisfies In <Ic, $\theta$=arctan $\{(Qc-Qn)/(Ic-In)\}$, and $-4\pi/8 \leq \theta < -3\pi/8$, the optimization unit 44 classifies the n-th signal point in the second division region B22 and increments the signal score by one. When the n-th signal point satisfies In<Ic, $\theta$=arctan $\{(Qc-Qn)/(Ic-In)\}$, and $-3\pi/8 \leq \theta < -\pi/8$, the optimization unit 44 classifies the n-th signal point in the third division region B23 and increments the signal score by one. When the n-th signal point satisfies In<Ic, $\theta$=arctan $\{(Qc-Qn)/(Ic-In)\}$, and $-\pi/8 \leq \theta < \pi/8$, the optimization unit 44 classifies the n-th signal point in the fourth division region B24 and increments the signal score by one. When the n-th signal point satisfies In<Ic, $\theta$=arctan $\{(Qc-Qn)/(Ic-In)\}$, and $\pi/8 \leq \theta < 3\pi/8$, the optimization unit 44 classifies the n-th signal point in the fifth division region B25 and increments the signal score by one. When the n-th signal point satisfies In<Ic, $\theta$=arctan $\{(Qc-Qn)/(Ic-In)\}$, and $3\pi/8 \leq \theta \leq 4\pi/\mathbf{8}$, the optimization unit 44 classifies the n-th signal point in the sixth division region B26 and increments the signal score by one.

The optimization unit 44 calculates the fifth signal score $\alpha 2$ by adding the signal score of the first division region B21 and the signal score of the fifth division region B25. Further, the optimization unit 44 calculates the sixth signal score $\beta 2$ by adding the signal score of the third division region B23 and the signal score of the seventh division region B27. Note that the adjustment amount TH is, for example, 10% of the signal scores of the entire first quadrant A1 to be monitored.

When the condition of $\alpha 2 \geq (\beta 2 + TH)$ holds, the optimization unit 44 determines that the constellation shape is triangular. When the constellation shape is determined as being triangular, the optimization unit 44 determines that, in the current state, the average length of the phase estimation unit 41 is short and the BER is high. As a result, when the constellation shape is determined as being triangular, the optimization unit 44 sets to lengthen the average length of the phase estimation unit 41. The phase estimation unit 41 lengthens the average length based on the content of the setting of the optimization unit 44.

When the condition of $\beta 2 (\alpha 2 + TH)$ holds, the optimization unit 44 determines that the constellation shape is the shape deformed to be close to the signal point distribution of another adjacent symbol region. Then, when the constellation shape is determined as being the deformed shape, the optimization unit 44 determines that, in the current state, the average length of the phase estimation unit 41 is long and the BER is high. As a result, when the constellation shape is determined as being the deformed shape, the optimization unit 44 sets to shorten the average length of the phase estimation unit 41. The phase estimation unit 41 shortens the average length based on the content of the setting of the optimization unit 44.

When the condition of $-TH < (\alpha 2 - \beta 2) < TH$ holds, the optimization unit 44 determines that the constellation shape is circular. Then, when the constellation shape is determined as being circular, the optimization unit 44 determines that, in the current state, the average length of the phase estimation unit 41 is optimum and the BER is low. As a result, when the constellation shape is determined as being circular, the optimization unit 44 maintains the current setting with regard to the average length of the phase estimation unit 41. The phase estimation unit 41 maintains the current average length based on the content of the setting of the optimization unit 44.

Figure 10A:
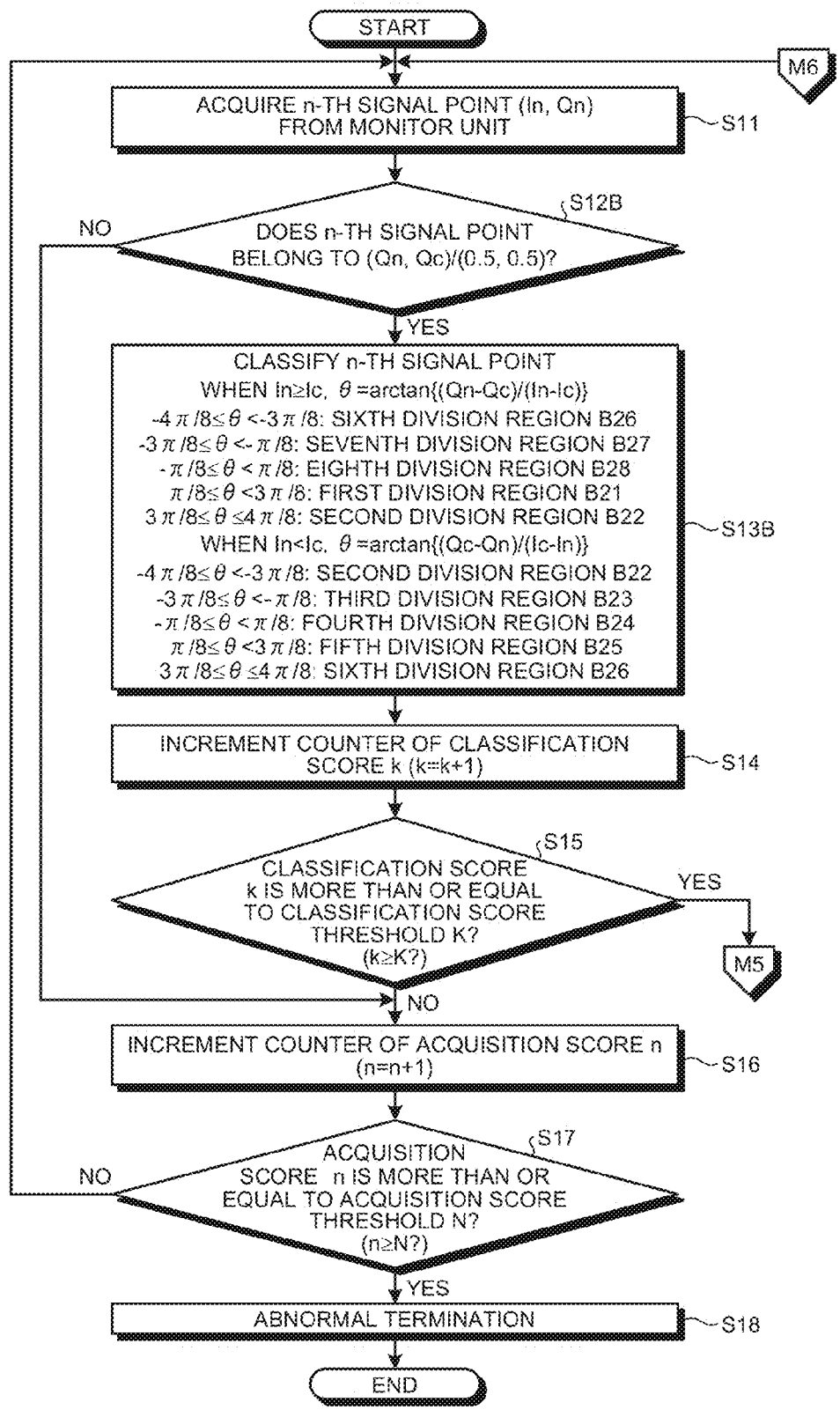
FIG. 10A is a flowchart illustrating an example of a process operation of an optimization unit related to the average length setting process of the third embodiment.
Figure 10B:
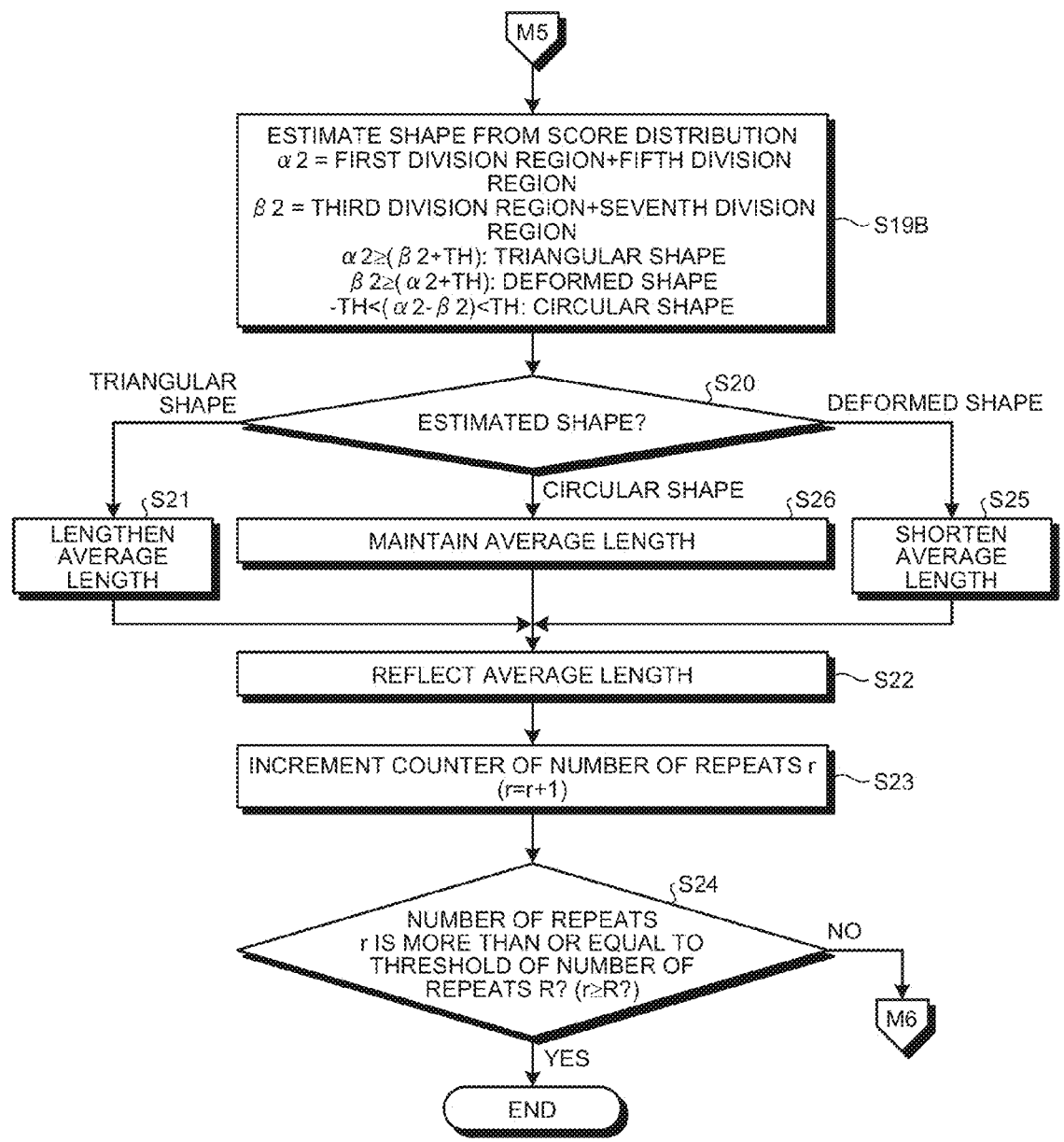
FIG. 10B is a flowchart illustrating an example of a process operation of the optimization unit related to the average length setting process of the third embodiment.

Next, the operation of the optical receiver 3 in the optical transmission system 1 of the third embodiment is described. FIG. 10A and FIG. 10B are flowcharts each illustrating an example of the process operation of the optimization unit 44 related to the average length setting process according to the third embodiment. In the average length setting process, the signal points in the first division region B21 to the eighth division region B28 in the first symbol region C11 are accumulated and based on the result of the accumulation, the constellation shape is determined; then, based on the determination result, the average length of the phase estimation unit 41 is set.

In FIG. 10A, the optimization unit 44 determines whether the n-th signal point obtained in Step S11 belongs to the first symbol region C11 (Step S12B). When the n-th signal point belongs to the first symbol region C11 (Yes in Step S12B), the optimization unit 44 classifies the signal point in any of the first division region B21 to the eighth division region B28 in the first symbol region C11 (Step S13B). When the n-th signal point satisfies In≥Ic, θ=arctan {(Qn−Qc)/(In−Ic)}, and −4π/8≤θ<−3π/8, the optimization unit 44 classifies the n-th signal point in the sixth division region B26 and increments the signal score by one. When the n-th signal point satisfies In≥Ic, θ=arctan {(Qn−Qc)/(In−Ic)}, and −3π/8≤θ≤−π/8, the optimization unit 44 classifies the n-th signal point in the seventh division region B27 and increments the signal score by one. When the n-th signal point satisfies In≥Ic, θ=arctan {(Qn−Qc)/(In−Ic)}, and −π/8≤θ<π/8, the optimization unit 44 classifies the n-th signal point in the eighth division region B28 and increments the signal score by one. When the n-th signal point satisfies In≥Ic, θ=arctan {(Qn−Qc)/(In−Ic)}, and π/8≤θ<3π/8, the optimization unit 44 classifies the n-th signal point in the first division region B21 and increments the signal score by one. When the n-th signal point satisfies In≥Ic, θ=arctan {(Qn−Qc)/(In−Ic)}, and 3π/8≤θ≤4π/8, the optimization unit 44 classifies the n-th signal point in the second division region B22 and increments the signal score by one.

Further, when the n-th signal point satisfies In <Ic, θ=arctan {(Qc−Qn)/(Ic−In)}, and −4π/8 0<−3π/8, the optimization unit 44 classifies the n-th signal point in the second division region B22 and increments the signal score by one. When the n-th signal point satisfies In<Ic, θ=arctan {(Qc−Qn)/(Ic−In)}, and −3π/8≤θ≤−π/8, the optimization unit 44 classifies the n-th signal point in the third division region B23 and increments the signal score by one. When the n-th signal point satisfies In<Ic, θ=arctan {(Qc−Qn)/(Ic−In)}, and −π/8≤θ<π/8, the optimization unit 44 classifies the n-th signal point in the fourth division region B24 and increments the signal score by one. When the n-th signal point satisfies In<Ic, θ=arctan {(Qc−Qn)/(Ic−In)}, and π/8≤θ<3π/8, the optimization unit 44 classifies the n-th signal point in the fifth division region B25 and increments the signal score by one. When the n-th signal point satisfies In<Ic, θ=arctan {(Qc−Qn)/(Ic−In)}, and 3π/8≤θ<4π/8, the optimization unit 44 classifies the n-th signal point in the sixth division region B26 and increments the signal score by one.

Then, after the n-th signal point is classified in any of the first division region B21 to the eighth division region B28 in the first symbol region C11 in Step S13B, the optimization unit 44 executes the process operation of Step S14 to Step S18. Note that when the n-th signal point does not belong to the first symbol region C11 (No in Step S12B), the optimization unit 44 proceeds to Step S16 in the drawing.

When the classification score is more than or equal to the classification score threshold in Step S15 in FIG. 10A (Yes in Step S15), the optimization unit 44 in M5 of FIG. 10B estimates the constellation shape of the signal points from the score distribution of the signal points (Step S19B). The optimization unit 44 calculates the fifth signal score α2 by adding the signal score of the first division region B21 and the signal score of the fifth division region B25, and the second signal score β2 by adding the signal score of the third division region B23 and the signal score of the seventh division region B27. When the condition of α2≥(β2+TH) holds, the optimization unit 44 determines that the constellation shape of the first symbol region C11 is triangular. When the condition of β2≥(α2+TH) holds, the optimization unit 44 determines that the constellation shape of the first symbol region C11 is the deformed shape. When−TH<(α2−β2)<TH holds, the optimization unit 44 determines that the constellation shape of the first symbol region C11 is circular.

Then, based on the results of estimating the constellation shape of the first symbol region C11 in Step S19B, the optimization unit 44 executes the process operation of Step S20 to Step S26. When the number of repeats r is more than or equal to the threshold of the number of repeats R (Yes in Step S24), the optimization unit 44 proceeds to M6 in FIG. 10A.

In FIG. 10B, the optimization unit 44 divides the first symbol region C11 into the first to eighth division regions B21 to B28, and accumulates the classification score of the signal points in the unit of each of the division regions B21 to B28. Based on the classification scores of the signal points in each of the division regions B21 to B28, the optimization unit 44 estimates the constellation shape in the first symbol region C11. As a result, the optimization unit 44 can estimate the constellation shape in the first symbol region C11 correctly.

Moreover, when the constellation shape is estimated as being triangular, the optimization unit 44 lengthens the average length of the phase estimation unit 41 to optimize the average length. As a result, the phase estimation unit 41 can reduce the BER by optimizing the average length, thereby calculating the phase noise highly accurately.

When the constellation shape is estimated as being the deformed shape, the optimization unit 44 shortens the average length of the phase estimation unit 41 to optimize the average length. As a result, the phase estimation unit 41 can reduce the BER by optimizing the average length, thereby calculating the phase noise highly accurately.

Further, when the constellation shape is estimated as being circular, the optimization unit 44 determines that the average length of the phase estimation unit 41 is optimum state and maintains the average length. As a result, the phase estimation unit 41 can reduce the BER by optimizing the average length, thereby calculating the phase noise highly accurately.

In the third embodiment, the optimization unit 44 divides the first symbol region C11 into the first to eighth division regions B21 to B28, and accumulates the classification scores of the signal points in the unit of each of the division regions B21 to B28. Furthermore, based on the accumulated classification scores of the signal points in each of the division regions B21 to B28, the optimization unit 44 estimates the constellation shape in the first symbol region C11. As a result, the optimization unit 44 can estimate the constellation shape in the first symbol region C11 correctly.

Further, when the constellation shape is triangular, the optimization unit 44 lengthens the average length of the phase estimation unit 41 to optimize the average length. As a result, the phase estimation unit 41 can reduce the BER by optimizing the average length, thereby calculating the phase noise highly accurately.

When the constellation shape is the deformed shape, the optimization unit 44 shortens the average length of the phase estimation unit 41 to optimize the average length. As a result, the phase estimation unit 41 can reduce the BER by optimizing the average length, thereby calculating the phase noise highly accurately.

Further, when the constellation shape is circular, the optimization unit 44 determines that the average length of the phase estimation unit 41 is optimum state and maintains the average length. As a result, the phase estimation unit 41 can reduce the BER by optimizing the average length, thereby calculating the phase noise highly accurately.

In the first to third embodiments above, the symbol region is divided into a plurality of division regions, and the signal points in every division region in at least one symbol region are accumulated and based on the distribution of the accumulated signal points for every division region, the constellation shape is estimated. The plurality of regions into which a single symbol region is divided is desirably three or more regions. In the above embodiments, as the symbol region is divided into more regions, the process of classifying the each of signal points into the division region or estimating the shape from the signal point distribution in the each division region becomes complicated. Therefore, from the practical point of view, the number of division regions is desirably about eight at maximum.

Moreover, in the first to third embodiments, the signal points for every division region not in the single symbol region but in a plurality of symbol regions may be accumulated and based on the distribution of the accumulated signal points for every division region, the constellation shape may be estimated. For example, when there are eight symbol regions in the 8PSK method, the signal points for every division region in the eight symbol regions may be accumulated and based on the distribution of the accumulated signal points for every division region in the eight symbol regions, the constellation shape may be estimated. The constellation shape may alternatively be estimated based on the distribution of the accumulated signal points for every division region in a plurality of symbol regions out of the eight symbol regions.

Although the above embodiments describe the example of the optical receiver 3 applicable to the QPSK and 8PSK methods, the present invention is not limited thereto as long as the optical receiver 3 is applicable to the N-ary PSK method; the region is divided into a plurality of division regions around the symbol center coordinates of at least one symbol region of N number of symbol regions. Then, the signal points for every plural division regions in the symbol region are accumulated, and based on the distribution of the signal points in the symbol region, the constellation shape can be estimated.

Although the constellation shape corresponding to the distribution of the signal points for every division region in the symbol region is estimated in the above embodiments, the average length may be optimized based on the distribution of the signal points without estimating the shape.

The elements of each unit in the drawings are not necessarily structured physically as illustrated. In other words, the specific mode of the distribution or integration of each unit is not limited to the illustrated one and the entire or a part thereof can be distributed or integrated mechanically or physically in arbitrary unit in accordance with various loads or usage.

Various process functions executed in each device may be executed entirely or partly on a Central Processing Unit (CPU) (or a microcomputer such as a Micro Processing Unit (MPU) or a Micro Controller Unit (MCU)). Needless to say, the process functions may be executed entirely or partly on a program to be analyzed and executed in a CPU (or a microcomputer such as an MPU or MCU), or hardware by a wired logic.

Figure 11:
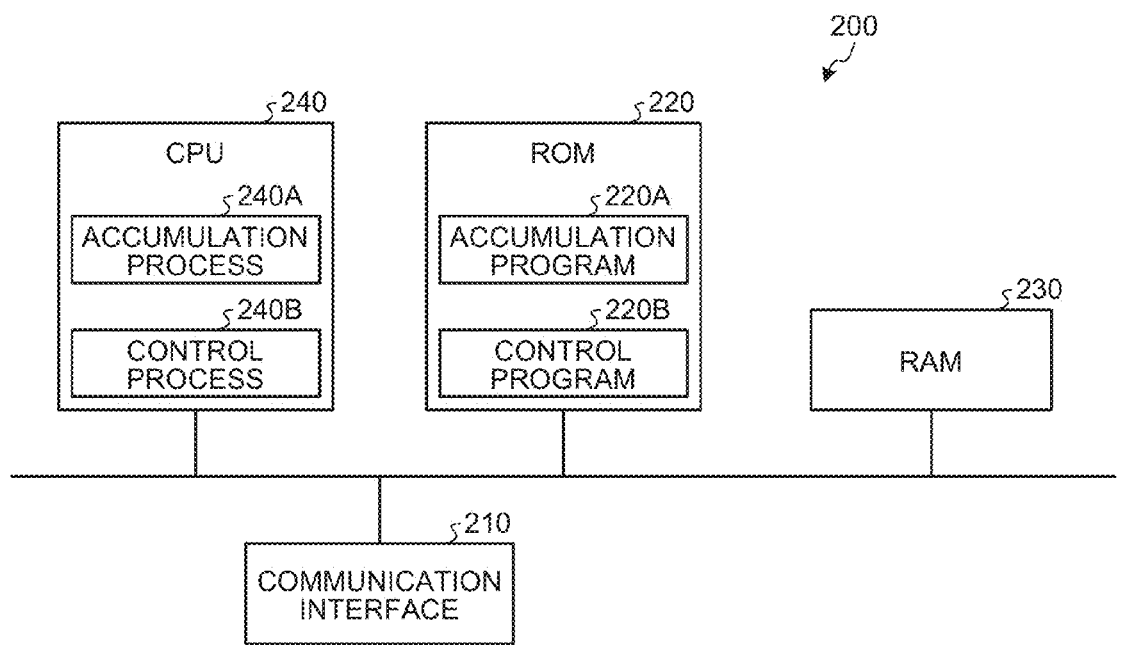
FIG. 11 is an explanatory view illustrating an example of an optical transmission device executing an optical signal processing program.
Figure 12:
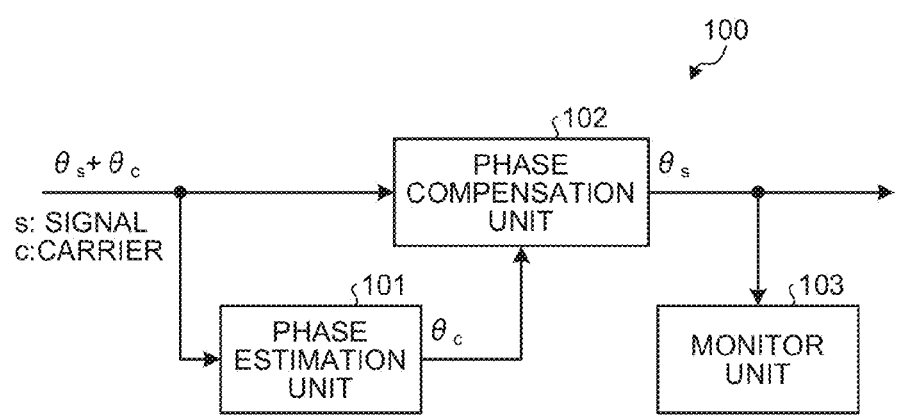
FIG. 12 is a block diagram illustrating an example of the phase estimation circuit.
Figure 13:
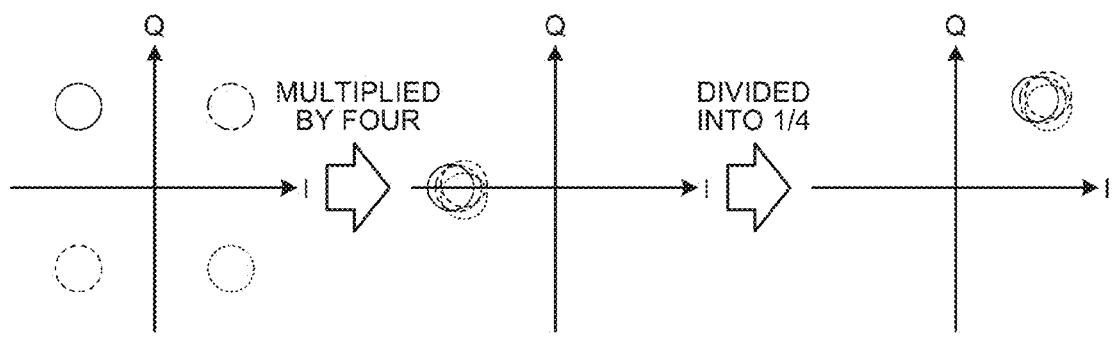
FIG. 13 is an explanatory view illustrating an example of the process of raising to the fourth power when the phase noise of a reception signal modulated by the QPSK method is calculated.
Figure 14:
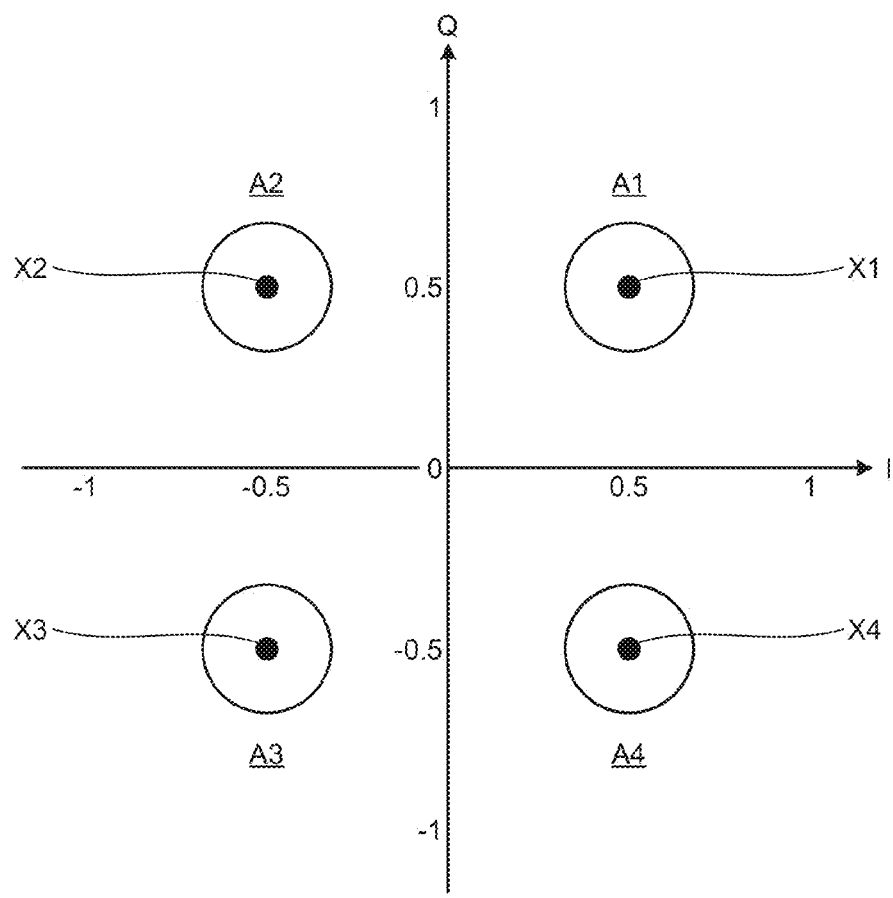
FIG. 14 is an explanatory view illustrating an example of the constellation of the QPSK method.

The processes described in this embodiment can be achieved by executing a prepared program in an optical transmission device. Description is hereinafter made of an example of the optical transmission device for executing a program having a function similar to the function described in the above embodiment. FIG. 11 is an explanatory view illustrating an optical transmission device 200 for executing an optical signal processing program.

The optical transmission device 200 for executing the optical signal processing program in FIG. 11 includes a communication interface 210, a ROM 220, a RAM 230, and a CPU 240.

The ROM 220 stores in advance an optical signal processing program for achieving the function similar to the function described in the above embodiment. Instead of the ROM 220, a driver-readable recording medium, which is not illustrated, may store the management program. The recording medium may be, for example, a portable recording medium such as a CD-ROM, a DVD disk, a USB memory, or an SD card, or a semiconductor memory such as a flash memory. The optical signal processing program is an accumulation program 220A and a control program 220B. Note that the programs 220A and 220B may be integrated or distributed as appropriate.

The CPU 240 reads out these programs 220A and 220B out of the ROM 220, and executes these respective read programs. Through the programs 220A and 220B, the CPU 240 functions as an accumulation process 240A and a control process 240B.

Out of a plurality of symbol regions into which the signal points that specifies the symbol information of the reception signal received from the communication interface 210 are classified, the CPU 240 divides at least one symbol region into a plurality of division regions from the center coordinates of the symbol region. Moreover, the CPU 240 accumulates the signal points of the symbol information for every division region in the symbol region. Based on the accumulated number of signal points for every division region, the CPU 240 controls the average length when calculating the phase noise of the optical signal. As a result, by optimizing the average length, the correct phase noise can be calculated.

In an aspect of the present disclosure, the correct phase noise can be calculated by optimizing the average length.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical signal processing device comprising:
   a count unit that divides at least one symbol region of a plurality of symbol regions into which signal points that specify symbol information included in an optical signal received are classified, into a plurality of division regions from a center coordinate of the symbol region and counts a number of signal points classified in a division region of the plurality of division regions in the symbol region, the optical signal including a plurality of phase signals; and
   a control unit that includes a determination unit that determines a shape of signal point distribution in the symbol region based on the counted number of signal points for every division region, and controls an average length that is related to a length of time during which phase signals are received from which a phase noise of the optical signal is calculated, based on the shape of the signal point distribution that is determined by the determination unit.

2. The optical signal processing device according to claim 1, wherein the control unit controls the average length so that the shape of the signal point distribution becomes circular around the center coordinate.

3. The optical signal processing device according to claim 1, wherein the count unit counts a number of the signal points classified for every division region of the symbol region for every symbol region;
   the determination unit determines a shape of signal point distribution in the symbol region based on the counted number of signal points for every division region in every symbol region; and
   the control unit controls the average length based on the shape of the signal point distribution determined for every symbol region.

4. An optical signal processing method for an optical signal processing device for specifying symbol information included in an optical signal received, the optical signal including a plurality of phase signals, the optical signal processing device executing:
   dividing at least one symbol region of a plurality of symbol regions into which signal points that specify the symbol information are classified, into a plurality of division regions from a center coordinate of the symbol region;
   counting a number of signal points classified in a division region of the plurality of division regions in the symbol region;
   determining a shape of signal point distribution in the symbol region based on the counted number of signal points for every division region; and
   controlling an average length that is related to a length of time during which phase signals are received from which a phase noise of the optical signal is calculated, based on the determined shape of the signal point distribution.

5. A non-transitory computer-readable recording medium having stored therein an optical signal processing program causing a processor of an optical signal processing device for specifying symbol information included in an optical signal received, the optical signal including a plurality of phase signals, to execute a process comprising:
   dividing at least one symbol region of a plurality of symbol regions into which signal points that specify the symbol information are classified, into a plurality of division regions from a center coordinate of the symbol region;
   counting a number of signal points classified in a division region of the plurality of division regions in the symbol region;
   determining a shape of signal point distribution in the symbol region based on the counted number of signal points for every division region; and
   controlling an average length that is related to a length of time during which phase signals are received from which a phase noise of the optical signal is calculated, based on the determined shape of the signal point distribution.

* * * * *